(12) United States Patent
Jain et al.

(10) Patent No.: US 8,587,975 B2
(45) Date of Patent: Nov. 19, 2013

(54) PWM CONTROL OF DUAL ACTIVE BRIDGE CONVERTERS

(75) Inventors: Amit Kumar Jain, Portland, OR (US); Rajapandian Ayyanar, Gilbert, AZ (US)

(73) Assignee: Arizona Board of Regents for and on behalf of Arizona State University, Scottsdale, AZ (US)

( * ) Notice: Subject to any disclaimer, the term of this patent is extended or adjusted under 35 U.S.C. 154(b) by 246 days.

(21) Appl. No.: 13/078,367

(22) Filed: Apr. 1, 2011

(65) Prior Publication Data

US 2011/0249472 A1 Oct. 13, 2011

Related U.S. Application Data

(60) Provisional application No. 61/320,095, filed on Apr. 1, 2010.

(51) Int. Cl.
*H02M 3/24* (2006.01)
*H02M 3/335* (2006.01)

(52) U.S. Cl.
USPC .............................................. 363/98; 363/17

(58) Field of Classification Search
USPC ............ 363/56.01, 15, 16, 17, 31, 39–41, 44, 363/89, 98, 132
See application file for complete search history.

(56) References Cited

U.S. PATENT DOCUMENTS

2008/0212340 A1* 9/2008 Tao et al. ......................... 363/17
2010/0182803 A1* 7/2010 Nan et al. .................... 363/21.02

OTHER PUBLICATIONS

Dual-Bridge DC-DC Converter with Wide-Range ZVS and Zero Circulating Current—Zhong Ye—IEEE—Sep. 2009.*
New AVS Phase Shift Modulated Full-Bridge Converter Topologies with Adaptive Energy Storage for SOFC Application—Andrew Mason—IEEE—Jan. 2008.*
Inoue, S. et al., "A bidirectional dc-dc converter for an energy storage system with galvanic isolation," IEEE Transactions on Power Electronics, vol. 22, No. 6, Nov. 2007, pp. 2299-2306.
Aggeler, D. Aggeler et al., "A compact, high voltage 25 kw, 50 khz dc-dc converter based on sic jfets," Proc. of the 23rd IEEE Applied Power Electronics Conference and Exposition (APEC'08), Dallas, Feb. 2008, pp. 801-807.
Ariyur, K. B. et al., Real-Time Optimization by Extremum-Seeking Control, Oxford, UK: John Wiley & Sons, Inc., Oct. 3, 2003, pp. 3-19.

(Continued)

*Primary Examiner* — Gary L Laxton
*Assistant Examiner* — Kyle J Moody
(74) *Attorney, Agent, or Firm* — Withrow & Terranova, P.L.L.C.

(57) ABSTRACT

A Dual Active Bridge (DAB) converter and a Pulse Width Modulation (PWM) scheme for controlling the DAB converter are disclosed. In general, the DAB converter includes a transformer, a first H-bridge that is connected to a primary winding of the transformer and controlled via first control signals, and a second H-bridge that is connected to a secondary winding of the transformer and controlled via second control signals. A controller provides the first and second control signals based on an input-to-output voltage ratio and load of the DAB converter such that, in addition to phase shift control, PWM control is simultaneously applied to both the first H-bridge and the second H-bridge when the DAB converter operates at low power and PWM control is applied to only one of the first H-bridge and the second H-bridge when the DAB converter operates above low power.

20 Claims, 18 Drawing Sheets

(56) References Cited

OTHER PUBLICATIONS

Dedoncker, R.W.A.A., "High power galvanically isolated dc/dc converter topology for future automobiles," Proc. of the 34th IEEE Power Electronics Specialists Conference (PESC'03), vol. 1, Acapulco, Mexico, Jun. 2003, pp. 27-32.

Dedoncker, R.W.A.A. et al., "A three-phase soft-switched high-power-density dc/dc converter for high-power applications," IEEE Transactions on Industry Applications, vol. 27 No. 1, Jan.-Feb. 1991, pp. 63-73.

Duarte, J. L. et al., "Three-port bidirectional converter for hybrid fuel cell systems," IEEE Transactions on Power Electronics, vol. 22, No. 2, Mar. 2007, pp. 1-22.

Inoue, S. et al., "A bidirectional isolated dc-dc converter as a core circuit of the next-generation medium-voltage power conversion system," IEEE Transactions on Power Electronics, vol. 22, No. 2, Mar. 2007, pp. 535-542.

Jain, A.K. et al., "PWM Control of the Dual Active Bridge: Comprehensive Analysis and Experimental Verification," Proc. of the 34th Annual Conference of the IEEE Industrial Electronics Society (IECON), Orlando, FL, Nov. 2008, pp. 909-915.

Kheraluwala, M. H. et al., "Performance characterization of a high-power dual active bridge dc-to-dc converter," IEEE Transactions on Industry Applications, vol. 28, No. 6, Nov.-Dec. 1992, pp. 1294-1301.

Krishnamurthy, H. et al., "Building block converter module for universal (ac-dc, dc-ac, dc-dc) fully modular power conversion architecture," Proc. of the 38th IEEE Power Electronics Specialists Conference (PESC'07), Orlando, FL, Jun. 2007, pp. 483-489.

Krismer, F. et al., "Performance optimization of a high current dual active bridge with a wide operating voltage range," Proc. of the 37th IEEE Power Electronics Specialists Conference (PESC'06), Jeju, Jun. 2006, pp. 1-7.

Liu, D. et al., "A zvs bi-directional dcdc converter for multiple energy storage elements," IEEE Transactions on Power Electronics, vol. 21, No. 5, Sep. 2006, pp. 1513-1517.

Oggier, G. et al., "Extending the zvs operating range of dual active bridge high-power dc-dc converters," Proc. of the 37th IEEE Power Electronics Specialists Conference (PESC'06), Jeju, Jun. 2006, pp. 1-7.

Peng, F. et al., "A new zvs bidirectional dc-dc converter for fuel cell and battery application," IEEE Transactions on Power Electronics, vol. 19, No. 1, pp. 54-65, Jan. 2004.

Spectrum Digital Company Website,"eZdsp™ F2808 for TMS320F2808 DSP in socket + Power supply + Code Composer Studio for C28xx," Spectrum Digital Inc., 2003. [Online], 2 pages, Accessed Dec. 12, 2011, available at: http://www.spectrumdigital.com/product_info.php?cPath=31&products_id=140&osCsid=1c0ec8669592a975637164a626ef820a.

Steigerwald, R. et al., "A comparison of high power dc to dc soft switched converter topologies," IEEE Transactions on Industry Applications, vol. 32, No. 6,Sep.-Oct. 1996, pp. 1139-1145.

Tao, H. et al., "Three-port triple-half-bridge bidirectional converter with zero-voltage switching," IEEE Transactions on Power Electronics, vol. 23, No. 2, Mar. 2008, pp. 782-792.

Tao, H. et al., "Transformer-coupled multiport zvs bidirectional dcdc converter with wide input range," IEEE Transactions on Power Electronics, vol. 23, No. 2, Mar. 2008, pp. 771-781.

Vangen, K. et al., "Efficient high-frequency soft-switched power converter with signal processor control," Proc. of the 13th International Telecommunications Energy Conference (INTELEC'91), Kyoto, Nov. 1991, pp. 631-639.

Vangen, K. et al., "Soft-switched high-frequency, high power dc/ac converter with igbt," Proc. of the 23rd IEEE Power Electronics Specialists Conference (PESC'92), vol. 1, Kyoto, Jun.-Jul. 1992, pp. 26-33.

Xiao, H. et al., "A zvs bidirectional dcdc converter with phase-shift plus pwm control scheme," IEEE Transactions on Power Electronics, vol. 23, No. 2, Mar. 2008, pp. 813-823.

Xu, D. et al., "A pwm plus phase-shift control bidirectional dc-dc converter," IEEE Transactions on Power Electronics, vol. 19, No. 3, May 2004, pp. 666-674.

Zhang, M. et al., "An improved dual active bridge dc/dc converter," Proc. of the 32nd IEEE Power Electronics Specialists Conference (PESC'01), vol. 1, Vancouver, BC, Jun. 2001, pp. 232-236.

Zhao et al., "A novel three-phase three-port ups employing a single high-frequency isolation transformer," Proc. of the 35th IEEE Power Electronics Specialists Conference (PESC'04), vol. 6, Aachen, Germany, Jun. 2004, pp. 4135-4141.

* cited by examiner

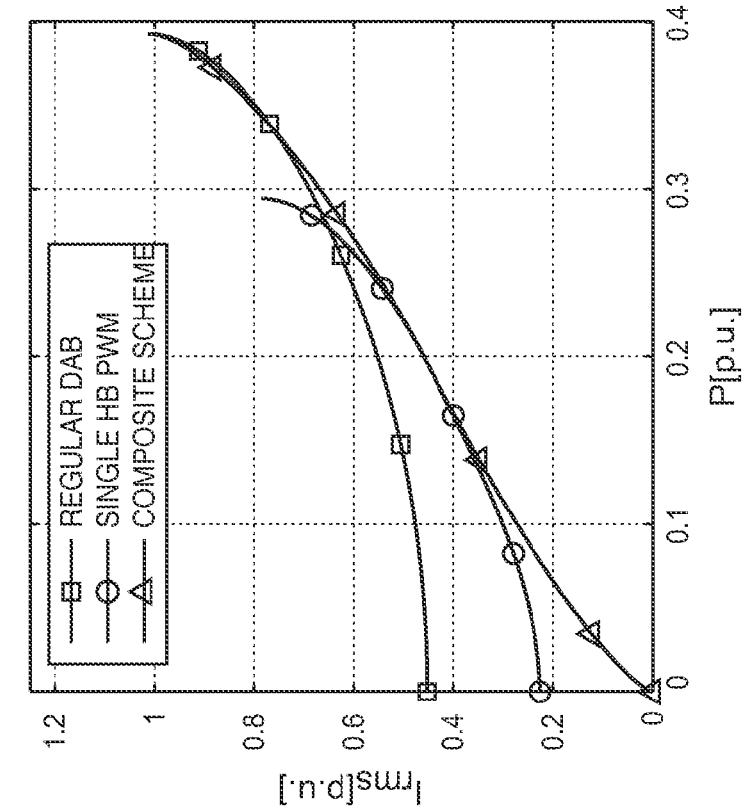
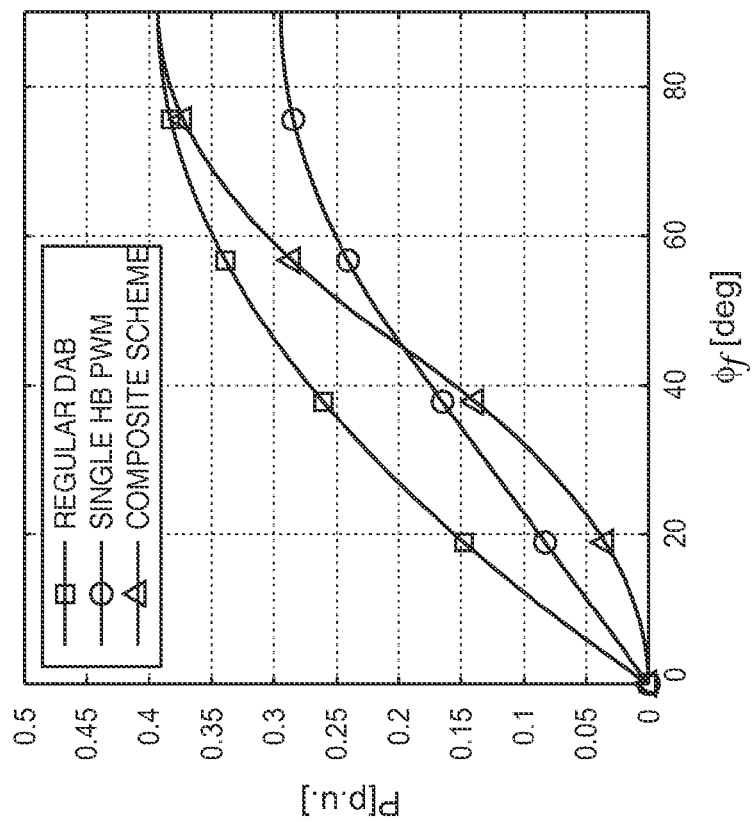
FIG. 9A
FIG. 9B

PWM CONTROL OF DUAL ACTIVE BRIDGE CONVERTERS

RELATED APPLICATIONS

This application claims the benefit of provisional patent application Ser. No. 61/320,095, filed Apr. 1, 2010, the disclosure of which is hereby incorporated herein by reference in its entirety.

GOVERNMENT SUPPORT

This invention was made with government funds under contract number N00014-07-M-0041 awarded by the Office of Naval Research. The U.S. Government may have rights in this invention.

FIELD OF THE DISCLOSURE

The present disclosure relates to a Dual Active Bridge (DAB) DC-DC converter and more specifically relates to a pulse width modulation control scheme for a DAB DC-DC converter.

BACKGROUND

A dual active bridge (DAB) DC-DC converter is ideally suited for high-power, galvanically isolated DC-DC conversion. The DAB DC-DC converter has advantages of high power density, Zero Voltage Switching (ZVS), bidirectional power transfer capability, a modular and symmetric structure, and simple control requirements. The DAB DC-DC converter can also be used for multi-port operation, which is a feature that is useful in interfacing several DC sources and loads using a single converter. Although several other bidirectional isolated DC-DC converter topologies have been proposed in literature, the simple symmetric structure and simple control mechanism of the DAB DC-DC converter are unique attributes. The DAB DC-DC converter has also been proposed as a building block for modular high power converters.

FIG. 1A is a schematic of a conventional DAB DC-DC converter 10 (hereinafter "DAB converter 10"). FIG. 1B illustrates the operating waveforms of the DAB converter 10 of FIG. 1A. As illustrated in FIG. 1A, the DAB converter 10 includes two H-bridges 12 and 14 (labeled HB1 and HB2, respectively) formed by switches $S_1$-$S_4$ and $S_{1s}$-$S_{4s}$ connected as shown. The DAB converter 10 also includes a transformer 16 constructed with a relatively high and controlled leakage inductance (L) represented as inductor 18. Since a high inductance (L) is required, either an external inductance or an integrated magnetic structure incorporating a series inductance, as shown in FIG. 1A, is used. The H-bridges 12 and 14 are operated at 50% duty ratio with their outputs phase-shifted by a controlled angle, or phase shift, $\phi$. The difference between voltages $v_p$ and $v_s$ of the H-bridges 12 and 14, respectively, appears across the inductor 18 representing the leakage inductance (L) of the transformer 16 and determines a transformer current ($I_L$) of the transformer 16. The normalized power transfer provided by the DAB converter 10 is given by:

$$P = m\phi(1 - |\phi|/\pi); \quad P_{base} = V_{dc1}^2/X_L \qquad \text{Eqn. (1)}$$

where $X_L = 2\pi f_{sw} L$, $f_{sw}$ is the switching frequency, L is the leakage inductance, $m = N_{ps} V_{ds2}/V_{dc1}$, $N_{ps}$ is the primary to secondary turns ratio ($N_p/N_s$), $V_{dc1}$ is the voltage across the H-bridge 12, and $V_{dc2}$ is the voltage across the H-bridge 14. Both the magnitude and direction of power transfer are controlled by the phase shift $\phi$. For $\phi > 0$, as in FIG. 1B, the H-bridge 12 leads the H-bridge 14, and power is transferred from $V_{dc1}$ to $V_{dc2}$. For $\phi < 0$, power is transferred in the reverse direction. Due to the leakage inductance (L), the current output of each of the H-bridges 12 and 14 lags the voltage output and discharges the switch capacitances during the dead times thereby achieving ZVS. However, the load range over which ZVS of all switches is achieved (i.e., the ZVS range of the DAB converter 10) is limited particularly when the input or output voltages vary significantly.

Notwithstanding all of the advantages of the conventional DAB converter 10, for applications requiring wide voltage variations, such as an interface for energy storage, fuel cells, or photovoltaics, the DAB converter 10 has limited ZVS range and high circulating currents at low loads. The high circulating currents at low loads results in poor efficiency when the DAB converter 10 is under a low load condition. Thus, there is a need for an improved DAB converter that provides an increased ZVS range and/or increased efficiency particularly at low load conditions.

SUMMARY

A Dual Active Bridge (DAB) converter and a Pulse Width Modulation (PWM) scheme for controlling the DAB converter are disclosed. In general, the DAB converter includes a transformer, a first H-bridge that is connected to a primary winding of the transformer and controlled via first control signals, and a second H-bridge that is connected to a secondary winding of the transformer and controlled via second control signals. A controller provides the first and second control signals based on an input-to-output voltage ratio and load of the DAB converter such that, in addition to phase shift control, PWM control is simultaneously applied to both the first H-bridge and the second H-bridge when the DAB converter operates at low power as determined based on the input-to-output voltage ratio and load of the DAB converter and PWM control is applied to only one of the first H-bridge and the second H-bridge when the DAB converter operates above low power as determined based on the input-to-output voltage ratio. Further, in one embodiment, no PWM control is applied to the DAB converter when operating at high power. As a result of the aforementioned control scheme, the efficiency of the DAB converter, especially at low load conditions, is substantially improved and a Zero Voltage Switching (ZVS) range of the DAB converter is extended down to no load. Further, in some embodiments, a size of the transformer is substantially reduced.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1A:
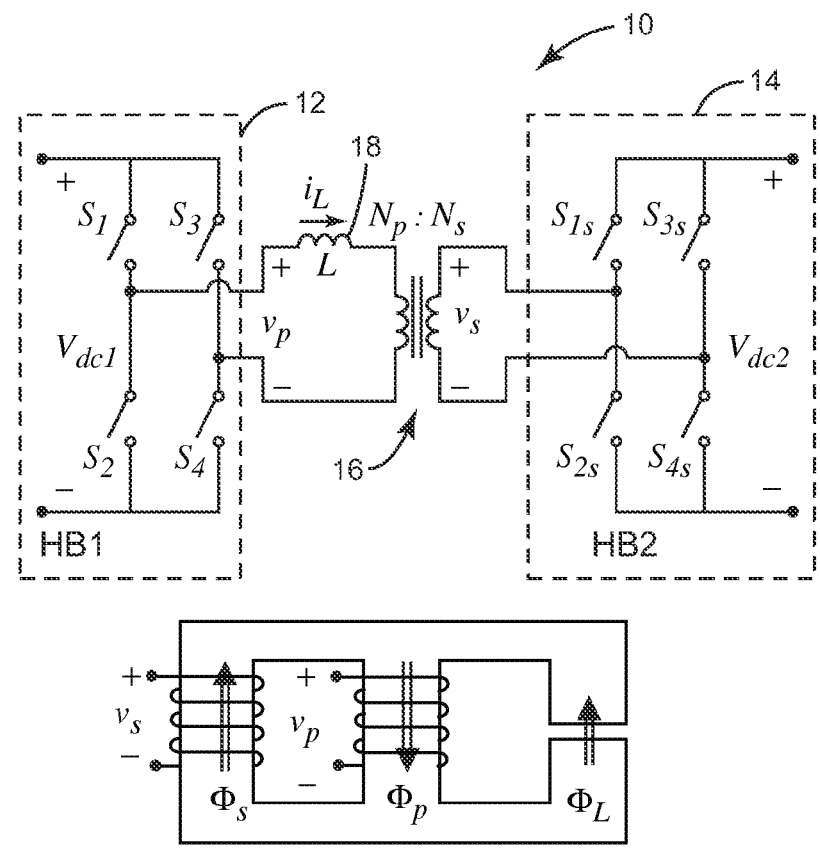
FIGS. 1A and 1B illustrate a conventional Dual Active Bridge (DAB) converter and operating waveforms for the conventional DAB converter.
Figure 1B:
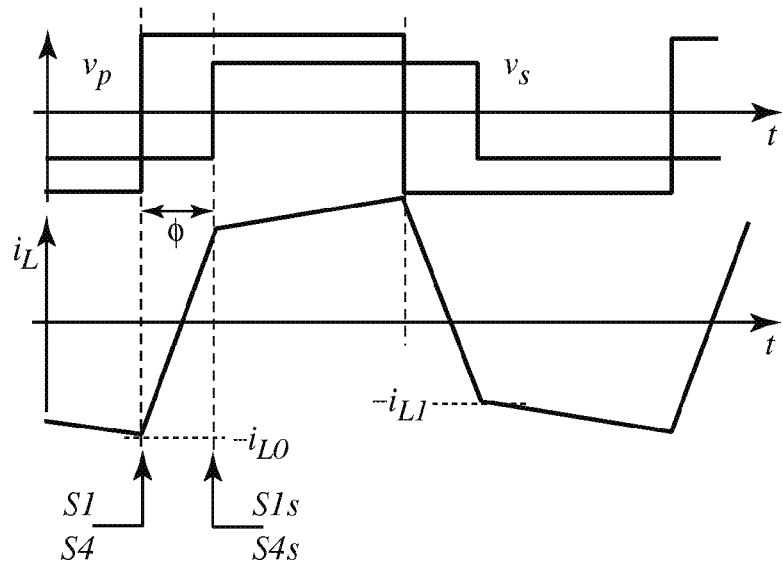
Figure 2:
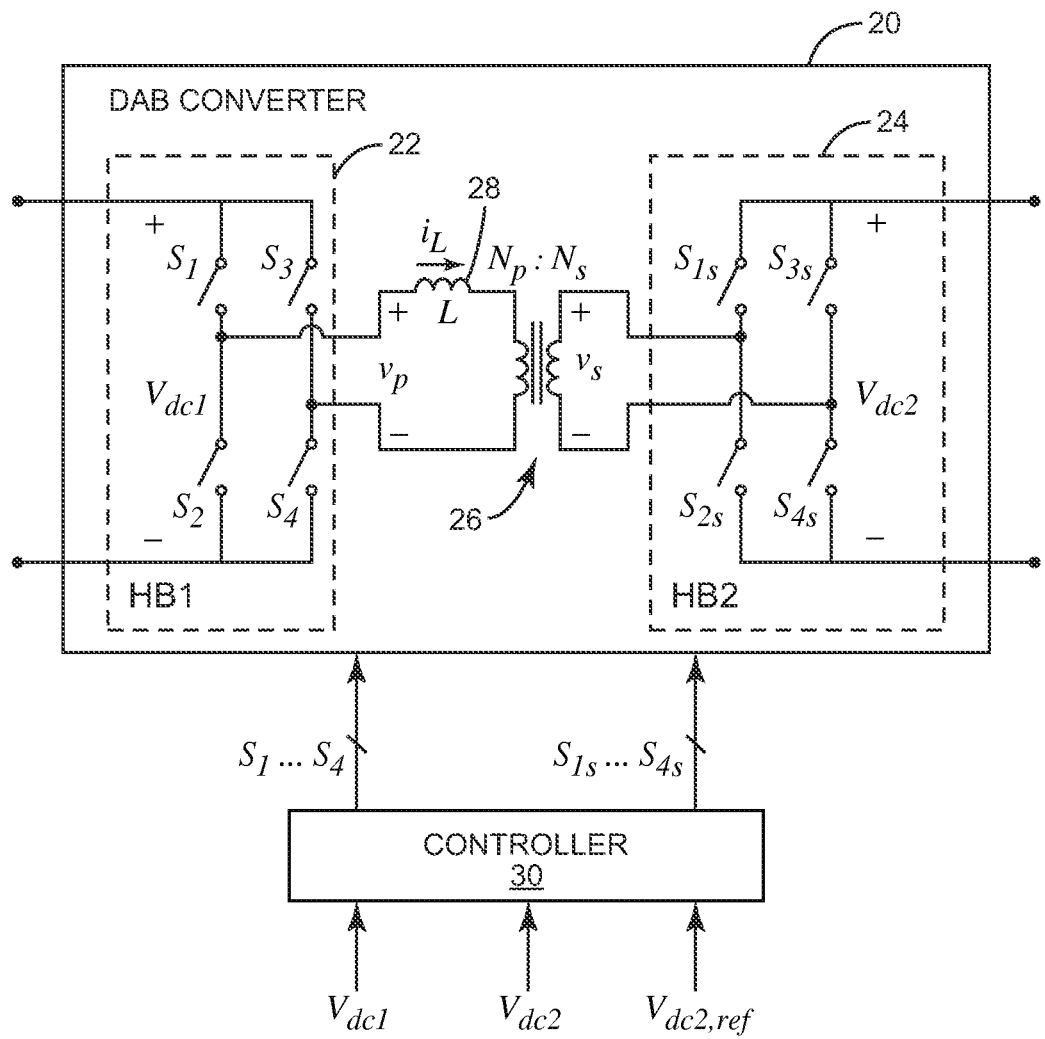
FIG. 2 illustrates a DAB converter controlled according to a composite Pulse Width Modulation (PWM) control scheme according to one embodiment of the present disclosure.
Figure 4A:
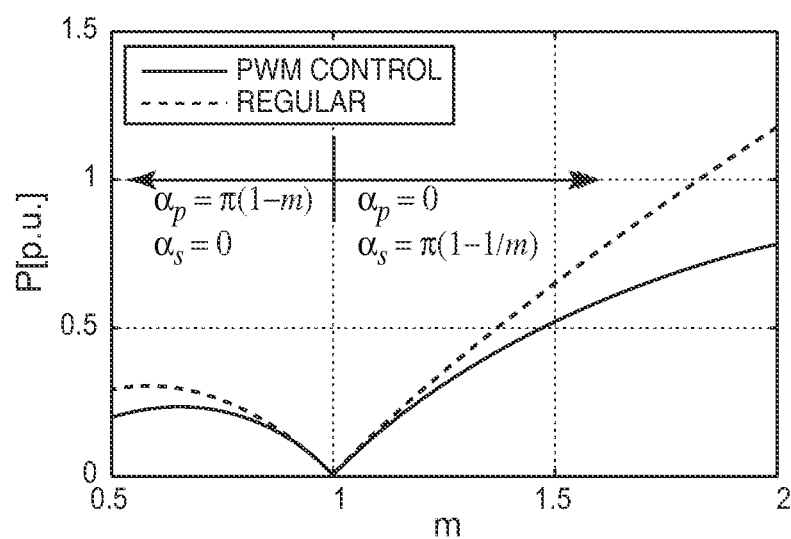
Figure 4B:
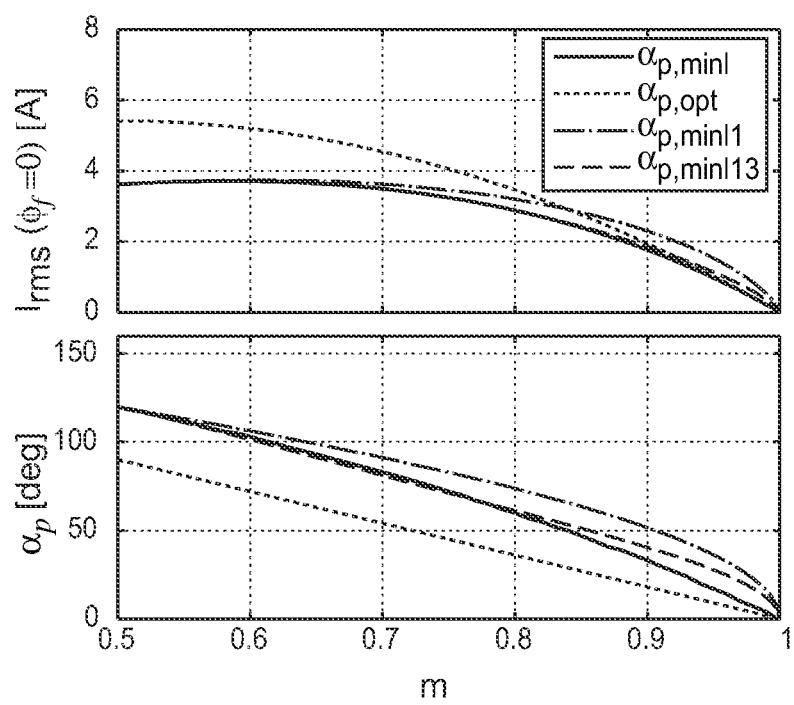
Figure 4C:
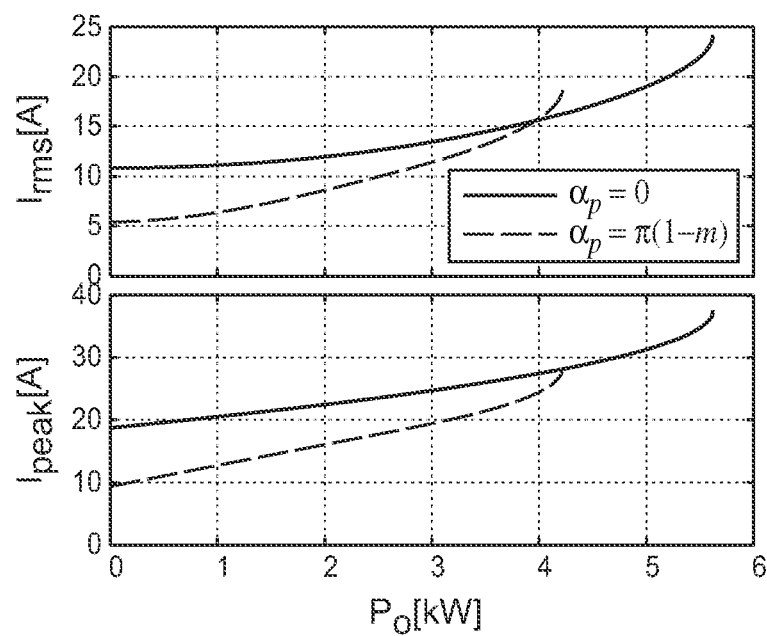
Figure 6:
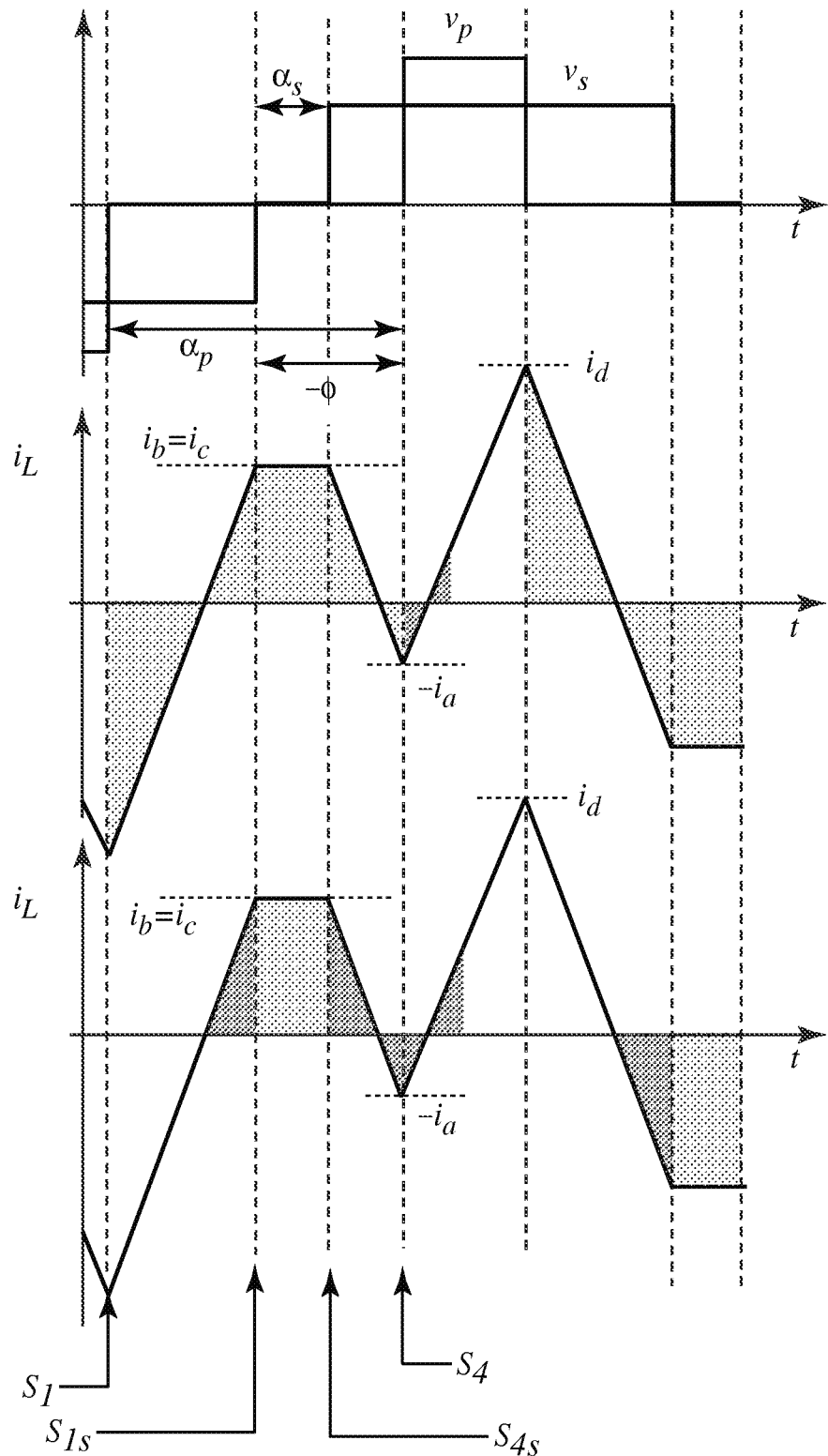
Figure 7:
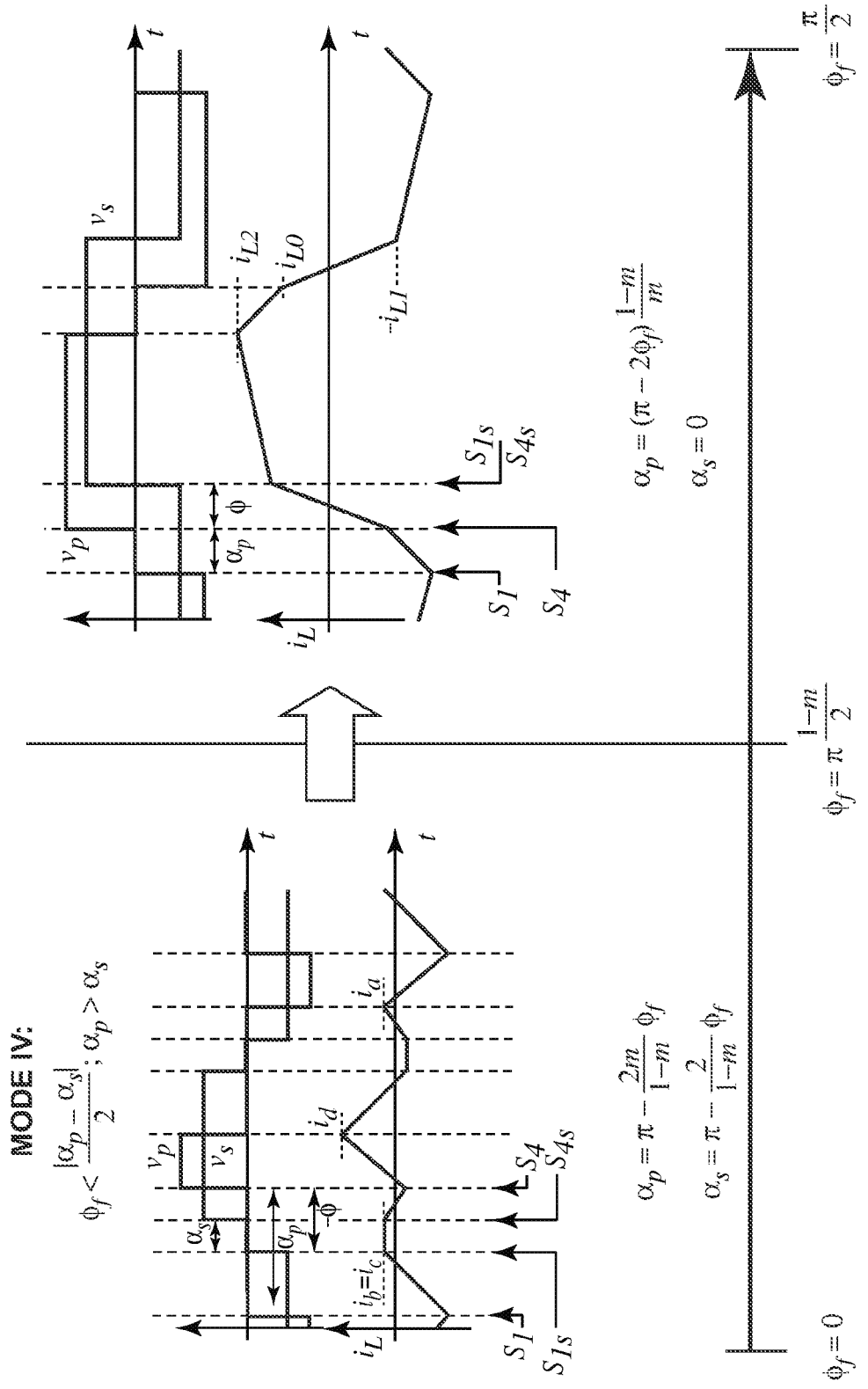
Figure 8:
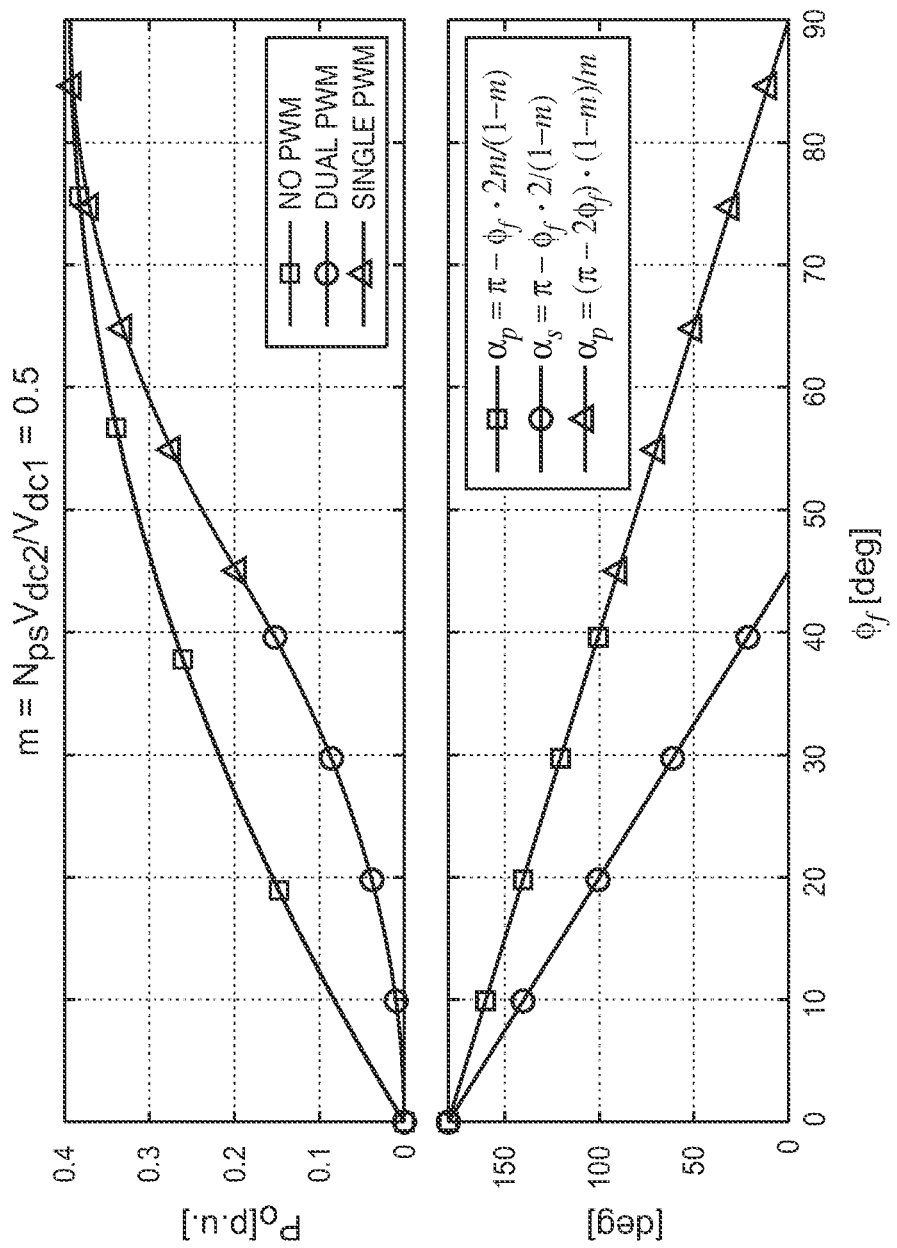
Figure 10:
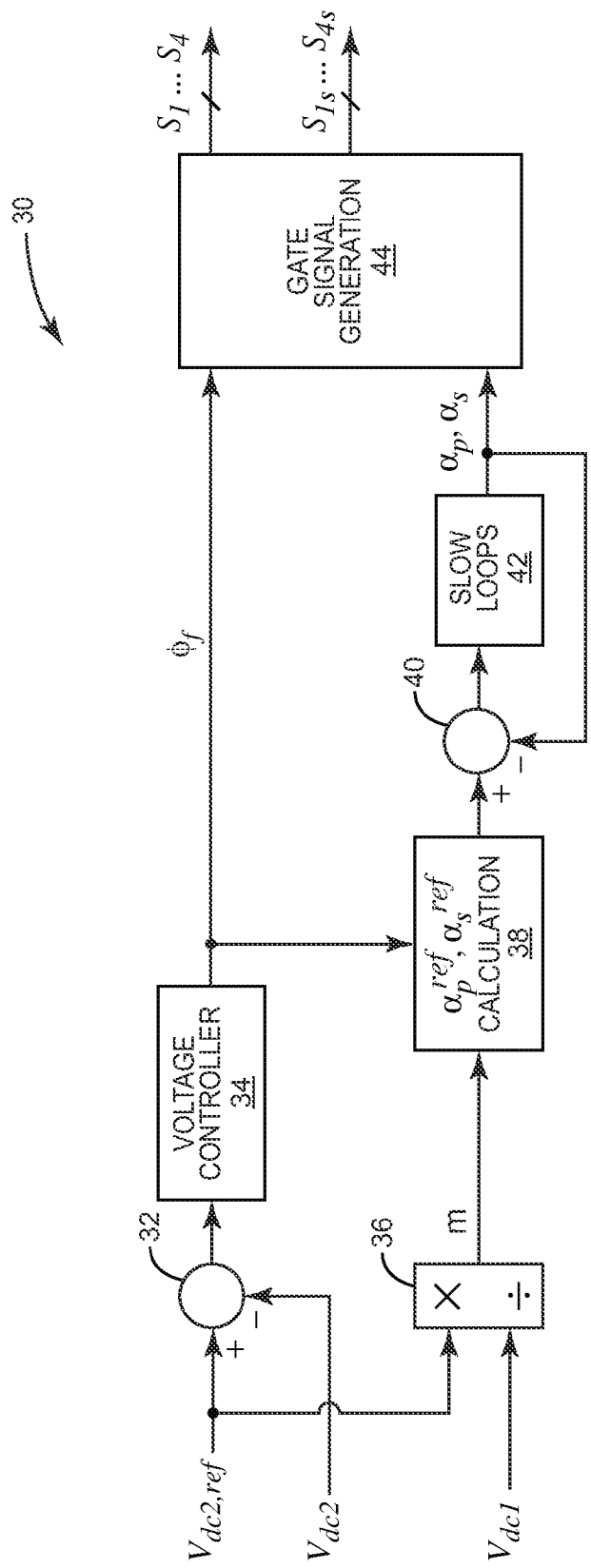
Figure 11:
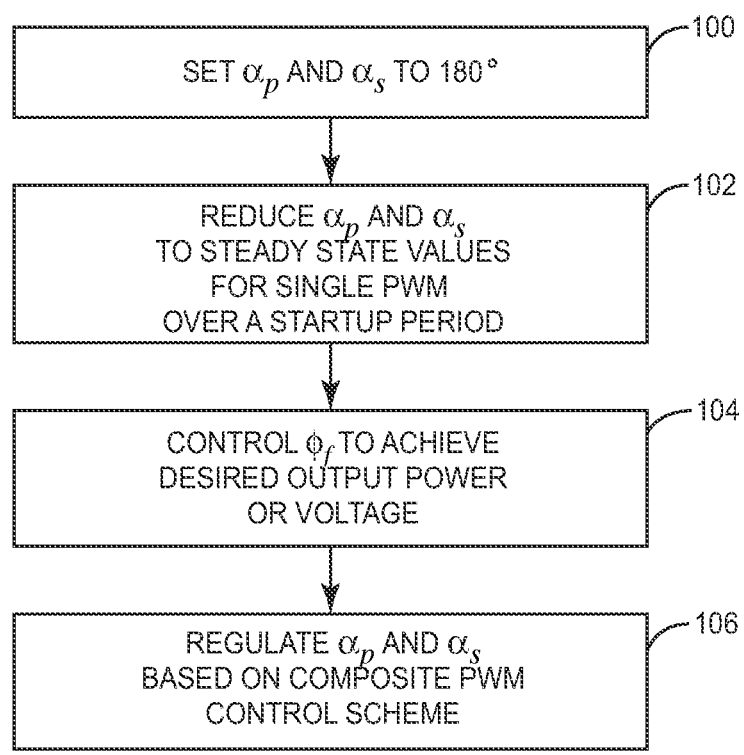
Figure 12A:
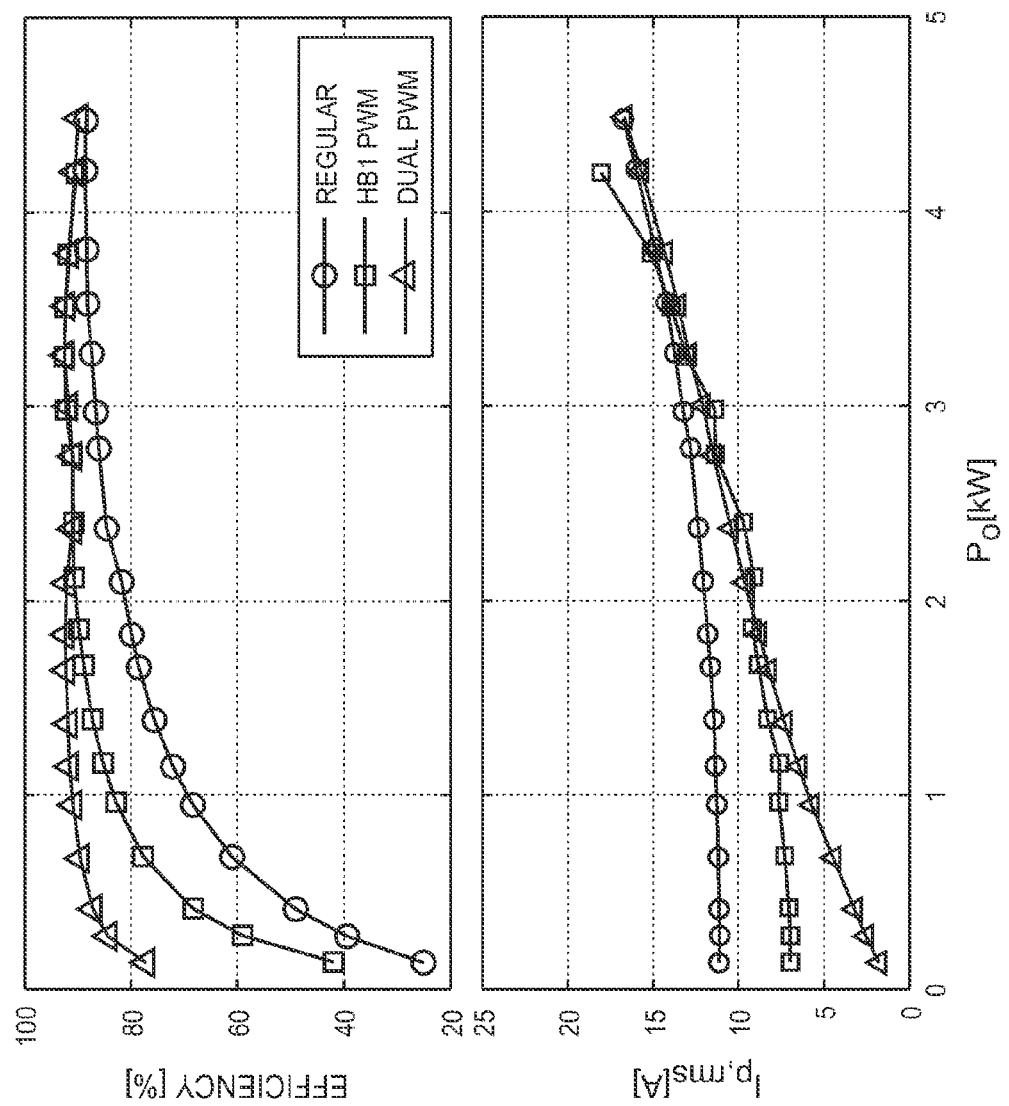
Figure 12B:
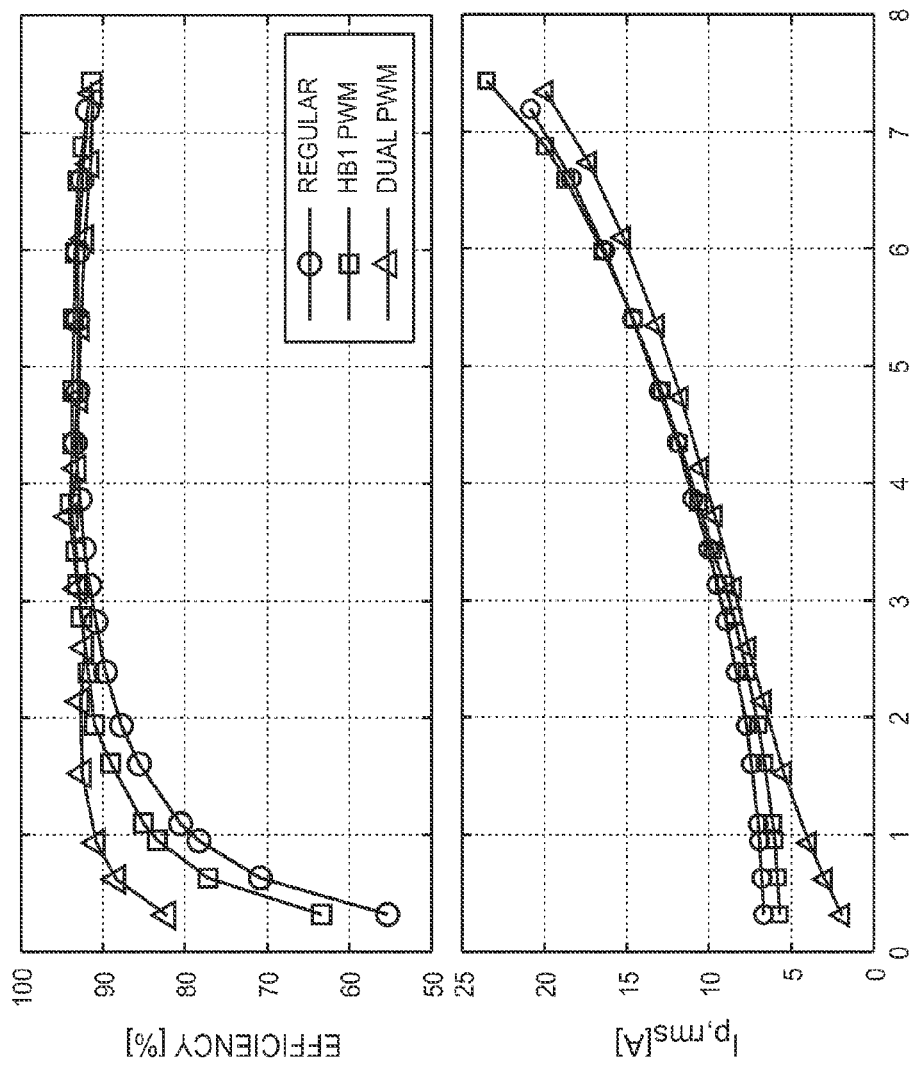

FIG. 4A graphically illustrates a comparison of minimum power required to achieve Zero Voltage Switching (ZVS) for the conventional DAB converter of FIG. 1 as compared to that of the DAB converter of FIG. 2 with PWM control according to one embodiment of the present disclosure;

FIG. 4B graphically illustrates a comparison of Root Mean Squared (RMS) current and peak currents for the DAB converter of FIG. 2 for different freewheeling intervals applied to the primary winding for single PWM control;

FIG. 4C graphically compares the variation of the RMS current of the DAB converter of FIG. 2 with load for single PWM control using an optimal freewheeling interval;

FIGS. 5A through 5E illustrate operating waveforms for dual PWM control of the DAB converter of FIG. 2;

FIG. 6 illustrates the operating waveforms of Mode IV dual PWM control and associated circulating currents;

FIG. 7 illustrates a composite PWM control scheme for the DAB converter of FIG. 2 according to one embodiment of the present disclosure;

FIG. 8 graphically illustrates primary and secondary freewheeling intervals applied to the DAB converter for the composite PWM control scheme as well as the resulting output power of the DAB converter according to one exemplary embodiment of the present disclosure;

FIGS. 9A and 9B graphically compare the output power and RMS current of the conventional DAB converter of FIG. 1 with that of a DAB converter using only single PWM control and the DAB converter of FIG. 2 using a composite PWM control scheme according to one embodiment of the present disclosure;

FIG. 10 illustrates the controller of FIG. 2 in more detail according to one embodiment of the present disclosure;

FIG. 11 illustrates a soft-start process for the DAB converter of FIG. 2 according to one embodiment of the present disclosure; and FIGS. 12A and 12B graphically illustrate the improved efficiency of the DAB converter of FIG. 2 for low load conditions according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 2 illustrates a Dual Active Bridge (DAB) DC-DC converter 20 (hereinafter "DAB converter 20") controlled via a composite Pulse Width Modulation (PWM) control scheme according to one embodiment of the present disclosure. As illustrated, the DAB converter 20 includes two H-bridges 22 and 24 (labeled HB1 and HB2, respectively) formed by switches $S_1$-$S_4$ and $S_{1s}$-$S_{4s}$ connected as shown. The DAB converter 20 also includes a transformer 26 constructed with a relatively high and controlled leakage inductance (L) represented as inductor 28. Since a high inductance (L) is required, either an external inductance or an integrated magnetic structure incorporating a series inductance is used. The H-bridges 22 and 24 are operated at 50% duty ratio with their outputs phase-shifted by a controlled angle φ. The difference between voltages $V_p$ and $V_s$ of the H-bridges 22 and 24, respectively, appears across the inductor 28 representing the leakage inductance (L) of the transformer 26 and determines a transformer current ($I_L$) of the transformer 26.

As discussed below in detail, the DAB converter 20, and more specifically the switches $S_1$-$S_4$ and $S_{1s}$-$S_{4s}$ of the H-bridges 22 and 24, is controlled by a controller 30. The controller 30 is implemented in hardware or a combination of hardware and software. For example, the controller 30 may be implemented as a Digital Signal Processor (DSP) or the like. In general, the controller 30 operates to generate control signals for the switches $S_1$-$S_4$ and $S_{1s}$-$S_{4s}$ to provide PWM control of the H-bridges 22 and 24. More specifically, the controller 30 operates to generate control signals for the switches $S_1$-$S_4$ and $S_{1s}$-$S_{4s}$ based on a ratio of input-to-output voltage and a load condition of the DAB converter 20 to provide single PWM control of the DAB converter 20 wherein PWM control is applied to only one of the H-bridges 22 and 24 or to provide dual PWM control of the DAB converter 20 where PWM control is simultaneously applied to both of the H-bridges 22 and 24. Notably, the single or dual PWM control is provided in addition to normal phase shift control (i.e., control of a phase shift φ between the two H-bridges 22 and 24). In the preferred embodiment, the controller 30 operates to provide a composite PWM control scheme wherein dual PWM control is utilized for low power operation of the DAB converter 20 and single PWM control is utilized for intermediate and, in some embodiments, high power operation of the DAB converter 20.

As a result of the aforementioned composite control scheme, the efficiency of the DAB converter 20, especially at low load conditions, is substantially improved and a Zero Voltage Switching (ZVS) range of the DAB converter 20 is extended down to no load. The efficiency of the DAB converter 20 is improved due to the simultaneous benefits of ZVS, lower peak and Root Mean Squared (RMS) currents, and lower magnetic core losses in the transformer 26 resulting from the composite control scheme. For example, in one embodiment, a nearly three-fold increase in efficiency (from 25% to 77%) is provided at a 3% load. Further, in some embodiments, a size of the transformer 26 is substantially reduced.

Figure 3A:
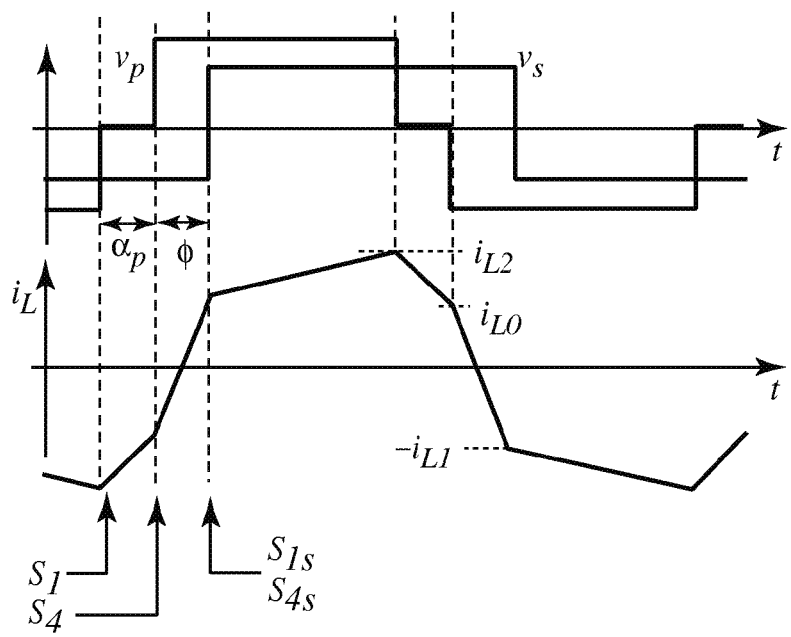
FIGS. 3A through 3D illustrate operating waveforms for single PWM control of the DAB converter of FIG. 2.
Figure 3B:
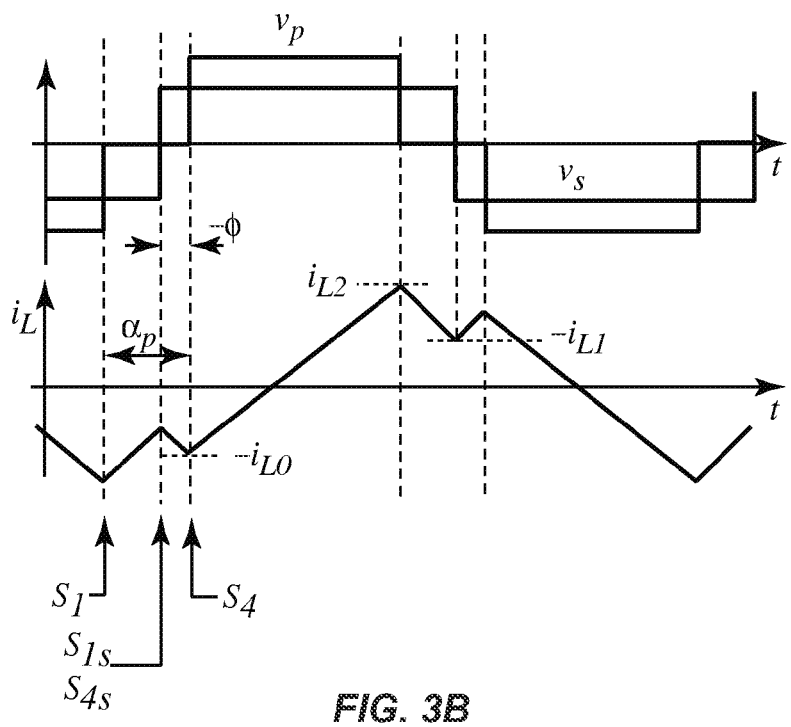
Figure 3C:
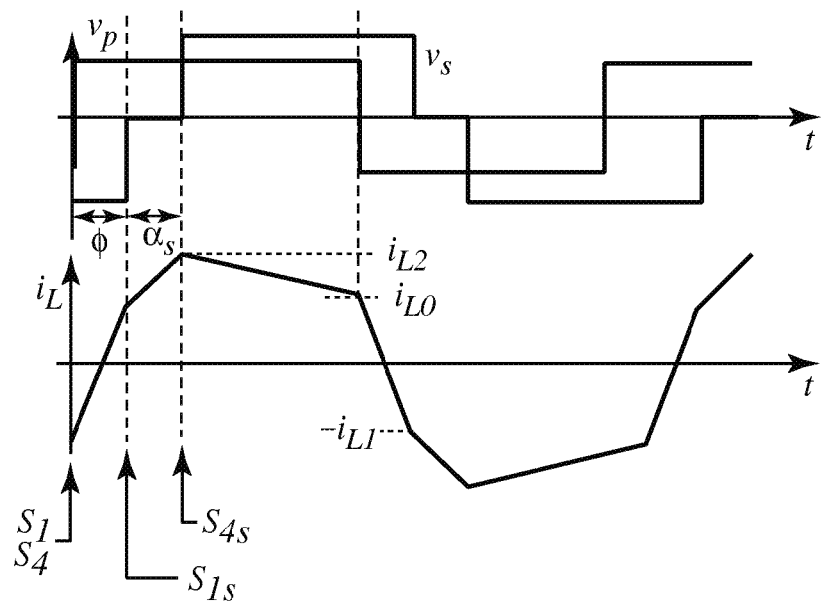
Figure 3D:
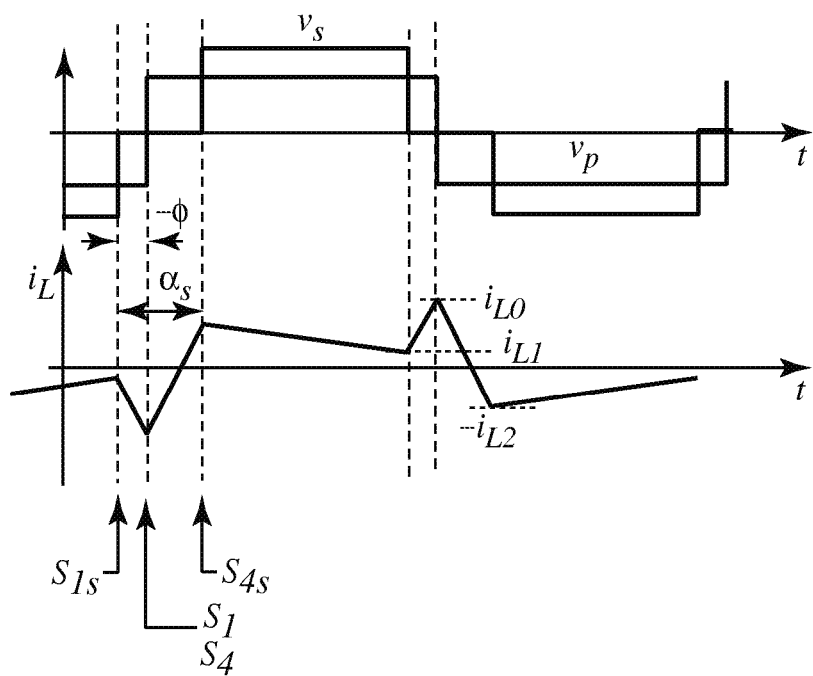

Before specifically discussing the composite control scheme provided by the controller 30, a discussion of single PWM control, dual PWM control, and their associated advantages is beneficial. FIGS. 3A through 3D show waveforms for single PWM control of the H-bridges 22 and 24 of the DAB converter 20 of FIG. 2. Specifically, FIG. 3A illustrates the operating waveforms of the DAB converter 20 when PWM control is applied to only the H-bridge 22 for m<1 and φ>0, where m=$N_{ps}V_{dc2}/V_{dc1}$, $N_{ps}$ is the primary to secondary turns ratio ($N_p/N_s$) of the transformer 26 and φ is the controlled phase shift between the outputs of the H-bridges 22 and 24. FIG. 3B illustrates the operating waveforms of the DAB converter 20 when PWM control is applied to only the H-bridge 22 for m<1 and φ<0. FIG. 3C illustrates the operating waveforms of the DAB converter 20 when PWM control is applied to only the H-bridge 24 for m>1 and φ>0. Lastly, FIG. 3D illustrates the operating waveforms of the DAB converter 20 when PWM control is applied to only the H-bridge 24 for m>1 and φ<0. Notably, in FIGS. 3A through 3D, $α_p$ defines the PWM applied to the H-bridge 22, and $α_s$ defines the PWM applied to the H-bridge 24. Further, $i_{LO}$, $i_{L1}$, and $i_{L2}$ are currents at vertices in the inductor current ($i_L$) waveform resulting from transitions in open/closed states of the switches $S_1$-$S_4$ and $S_{1s}$-$S_{4s}$ of the H-bridges 22 and 24.

For single PWM control, the controller 30 essentially controls the switches $S_1$-$S_4$ or $S_{1s}$-$S_{4s}$ to essentially freewheel (i.e., short) either the primary or the secondary winding of the transformer 26 for an angle $\alpha_p$ or $\alpha_s$, respectively. As such, the angles $\alpha_p$ or $\alpha_s$ are also referred to herein as freewheeling intervals. Using the H-bridge 22 as an example, freewheeling is achieved by phase-shifting the control signals for the switches of one H-bridge leg (e.g., the switches $S_1$ and $S_2$ which form a leading leg of the H-bridge 22) with respect to the other H-bridge leg (e.g., the switches $S_3$ and $S_4$ which form a lagging leg of the H-bridge 22), while retaining 50% duty ratio for each leg of the H-bridge 22. Neglecting the magnetizing current, the resulting current waveform and power transfer are given by expressions in Table I below. Note that the wave shapes and equations are different for $\phi>0$ and $\phi<0$.

TABLE I

Basic Equations for Single H-Bridge PWM

| | PWM of HB1 (m < 1) | PWM of HB2 (m > 1) |
|---|---|---|
| | $\phi > 0$ | |
| $i_{L0}$ | $\frac{1}{2}[(1+m)\phi + (1-m)(\pi-\phi) - \alpha_p]$ | $\frac{1}{2}[(1+m)\phi + (1-m)(\pi-\phi) + m\alpha_s]$ |
| $i_{L1}$ | $\frac{1}{2}[(1+m)\phi - (1-m)(\pi-\phi) - \alpha_p]$ | $\frac{1}{2}[(1+m)\phi - (1-m)(\pi-\phi) - m\alpha_s]$ |
| $i_{L2}$ | $\frac{1}{2}[(1+m)\phi + (1-m)(\pi-\phi) + (2m-1)\alpha_p]$ | $\frac{1}{2}[(1+m)\phi - (1-m)(\pi-\phi) + (2-m)\alpha_s]$ |
| P | $m\left[\phi\left(1-\frac{\phi}{\pi}\right) + \frac{\alpha_p}{2}\left(1-\frac{2\phi+\alpha_p}{\pi}\right)\right]$ | $m\left[\phi\left(1-\frac{\phi}{\pi}\right) + \frac{\alpha_s}{2}\left(1-\frac{2\phi+\alpha_s}{\pi}\right)\right]$ |
| | $\phi < 0$ | |
| $i_{L0}$ | $\frac{1}{2}[-2m\phi + (1-m)\pi - \alpha_p]$ | $\frac{1}{2}[-(m-1)\pi + m\alpha_s]$ |
| $i_{L1}$ | $\frac{1}{2}[-(1-m)\pi + \alpha_p]$ | $\frac{1}{2}[2\phi - (m-1)\pi + m\alpha_s]$ |
| $i_{L2}$ | $\frac{1}{2}[2m\phi + (1-m)\pi + (2m-1)\alpha_p]$ | $\frac{1}{2}[2\phi + (m-1)\pi + (2-m)\alpha_s]$ |
| P | $m\left[\phi + \frac{\alpha_p}{2}\left(1-\frac{2\phi+\alpha_p}{\pi}\right)\right]$ | $m\left[\phi + \frac{\alpha_s}{2}\left(1-\frac{2\phi+\alpha_s}{\pi}\right)\right]$ |
| $\alpha_{p,opt}$ | $\pi(1-m)$ | 0 |
| $\alpha_{s,opt}$ | 0 | $\pi(1-1/m)$ |
| $P_{min}$ | $\frac{\pi}{2}m^2(1-m)$ for $\alpha_{p,opt}$ | $\frac{\pi}{2}\frac{m-1}{m}$ for $\alpha_{s,opt}$ |

Note:
all currents are normalized to $I_{base} = V_{dc1}/X_L$

Rewriting the power transfer expression in a more convenient form gives better insight. Defining the phase shift between the fundamental components of the primary and secondary voltages ($V_p$ and $V_s$), $$\phi_f = \phi + \alpha/2$$

where $$\alpha = \begin{cases} \alpha_p & \text{for } HB1\,PWM \\ \alpha_s & \text{for } HB2\,PWM, \end{cases}$$

the follow relations are provided $$\frac{P}{m} = \begin{cases} \phi_f\left(1 - \frac{|\phi_f|}{\pi}\right) - \frac{\phi_f \alpha^2}{|\phi_f| \cdot 4\pi} & |\phi_f| \geq \alpha/2 \\ \phi_f\left(1 - \frac{\alpha}{\pi}\right) & |\phi_f| < \alpha/2. \end{cases} \quad \text{Eqn. (2)}$$

Similar to regular DAB operation (i.e., operation of the conventional DAB converter 10 of FIGS. 1A and 1B), $\phi_f>0$ leads to power transfer from $V_{dc1}$ to $V_{dc2}$ while $\phi_f<0$ leads to power transfer in the reverse direction. Equation (2), suggests that $\phi_f$ be chosen as the control variable for effecting power transfer and that $\alpha$ be chosen as a feed forward variable. For $\alpha=0$, $\phi_f=\phi$, a seamless transition from PWM control to regular DAB operation, which is also referred to herein as phase-shift control, is also provided. Equation (2) also shows a reduction in maximum power transfer capability at $\phi_f=\pi/2$ due to PWM. Approximating the power transfer solely by considering the fundamental components of the primary and secondary voltages ($v_p$ and $v_s$) provides $$\frac{P}{m} \cong \frac{8}{\pi^2}\cos\left(\frac{\alpha}{2}\right)\sin\phi_f. \quad \text{Eqn. (3)}$$

Numerical comparison shows that the fundamental approximation of Equation (3) is close to the exact value and serves as a convenient alternative.

Single PWM control provides advantages of increased ZVS range, lower RMS currents, and reduced transformer size. More specifically, with respect to ZVS range, with PWM of the H-bridge 22, ZVS of $S_1$ and $S_2$ (leading leg of the H-bridge 22) requires $i_{L2}>0$, ZVS of $S_3$ and $S_4$ (lagging leg of the H-bridge 22) requires $i_{L0}>0$, while ZVS of $S_{s1}$-$S_{s4}$ (the H-bridge 24) requires $i_{L1}>0$. The corresponding minimum values of 0 can be obtained by setting the appropriate current expressions in Table I to zero. An increase in $\alpha_p$ improves ZVS for the H-bridge 24; improves ZVS for the leading leg of the H-bridge 22 (assuming m>0.5); and worsens ZVS for the lagging leg of the H-bridge 22. The limiting condition is when a further increase in $\alpha_p$ leads to loss of ZVS in the lagging leg of the H-bridge 22. This gives an optimal value $\alpha_{p,opt}=\pi(1-m)$ for maximizing the ZVS range of the DAB converter 20. The corresponding minimum power (at $\phi=0$) value is listed in Table I. A similar reasoning for PWM of the H-bridge 24 leads to $\alpha_{s,opt}=\pi(1-1/m)$. In summary:

$$0.5<m<1 \Rightarrow \alpha_p=\pi(1-m), \alpha_s=0$$

$$1<m<2 \Rightarrow \alpha_p=0, \alpha_s=\pi(1-1/m) \quad \text{Eqn. (4)}$$

These optimal values effectively equate the average voltages applied to the two transformer windings, which is reminiscent of the conventional DAB where m=1 theoretically guarantees ZVS down to zero load.

Minimum power required to achieve ZVS in the conventional DAB converter 10 (FIGS. 1A and 1B) and the DAB converter 20 with PWM is illustrated in FIG. 4A. The ratio of minimum power required for ZVS with and without PWM can be derived to be:

$$\frac{P_{min,PWM}}{P_{min,Reg}} = \begin{cases} \frac{2m}{1+m} & \text{for } m < 1 \\ \frac{2}{1+m} & \text{for } m > 1 \end{cases} \quad \text{Eqn. (5)}$$

For a 0.5 to 2 variation in m, the minimum power required to achieve ZVS reduces by 33%. The gain in ZVS capability is especially important for high output voltages.

For lower power operation (with $P<P_{min,PWM}$, $\phi<0$), the H-bridge 24 experiences hard switching if m<1 and the H-bridge 22 is modulated, and the H-bridge 22 experiences hard switching if m>1 and the H-bridge 24 is modulated. Another possibility with $\phi<0$ is to increase $\alpha_p>\alpha_{p,opt}$ and ensure that the H-bridge 24 has ZVS by allowing the current to cross zero twice in one half cycle. This leads to a more complex control scheme requiring detection of converter operating mode but is useful if ZVS capability at low loads is essential, for example, in order to reduce Electromagnetic Interference (EMI).

The PWM duty cycle can also be chosen to minimize RMS transformer currents, and thereby conduction losses in windings and switches, instead of maximizing ZVS range. Exact analysis to find the optimum a for each value of m and each power level is quite complicated. A harmonic analysis is more useful. For PWM of the H-bridge 22, the fundamental and third harmonic inductor currents ($\bar{I}_1$ and $\bar{I}_3$), with the fundamental ($v_{p1}$) of the primary transformer voltage ($v_p$) chosen as reference for phase, are given by:

$$\bar{I}_1 = \frac{2\sqrt{2}}{\pi}[m\sin\phi_f - j\{\cos(\alpha_p/2) - m\cos\phi_f\}]$$

$$\bar{I}_3 = \frac{2\sqrt{2}}{9\pi}[m\sin 3\phi_f - j\{\cos(3\alpha_p/2) - m\cos 3\phi_f\}]$$

where the fundamental and third harmonic inductor currents ($\bar{I}_1$ and $\bar{I}_3$) are normalized to $I_{base}=V_{dc1}/(2\pi f_{sw}L)$. For a given power P, the RMS value of $I_1$, denoted by $I_{1,rms}$, is minimized by $$\alpha_{p,minI1}=2\cos^{-1}(m/\cos\phi_f) \quad \text{Eqn. (6)}$$

Note that this is not the same as equating the reactive component of $I_1$ to zero, since $\alpha_p$ also affects P. Equation (6) is obtained by setting $\partial I_{1,rms}/\partial \alpha_p=0$ while maintaining P given by Equation (3) constant. Including the third harmonic in the general case $\phi_f \neq 0$ renders analytical treatment practically infeasible. However, for the particular case of no load ($\phi_f=0$), the RMS value of the current accounting for the first and third harmonics is minimized for $\alpha_{p,minI13}=2\cos^{-1}x$, where x is the solution to:

$$16x^5-16x^3-4mx^2+30x-26m=0 \quad \text{Eqn. (7)}$$

Notably, while equations for $\alpha_{p,minI1}$ and $\alpha_{p,minI13}$ are given above for single PWM for m>1, similar expressions may be derived for $\alpha_{s,minI1}$ and $\alpha_{s,minI13}$ for single PWM for m>1. These equations hold for both $\phi>0$ and $\phi<0$.

FIG. 4B illustrates $\alpha_p$ variation with m for different criteria and the corresponding RMS currents at no load: (i) $\alpha_{p,opt}$ to maximize ZVS range; (ii) $\alpha_{p,minI1}$ to minimize $I_{1rms}$; (iii) $\alpha_{p,minI13}$ to minimize $I_{rms}$ considering fundamental and third harmonic components; and (iv) $\alpha_{p,minI}$ to minimize $I_{rms}$ numerically. The plotted results are for an exemplary implementation of the DAB converter 20 with design details of: $V_{dc1}=V_{dc2}=670$ V with ±20% variation in $Vd_{c2}$, $P_{on}=10$ kW, $f_{sw}=40$ kHz, $N_{ps}=1$, L=100 µH, $L_m=1$ mH, and $C_o=13$ µF, where $L_m$ is the magnetizing inductance and Co is the output filter capacitance. However, the concepts shown in FIG. 4B are not limited to the aforementioned exemplary implementation. It should be noted that $\alpha_p>\pi(1-m)$ leads to lower circulating current at the expense of ZVS range. For power levels where ZVS is not achievable with $\alpha_{p,opt}$, or if the converter has high conduction losses and low switching losses, using $\alpha_{p,minI}$ instead of $\alpha_{p,opt}$ will lead to higher efficiency. For simpler implementation, using $\alpha_{p,opt}=\pi(1-m)$ irrespective of load may be more appropriate.

FIG. 4C compares the RMS current variation with load for two cases: conventional DAB operation and $\alpha_p=\alpha_{p,opt}$. For the low output voltage ($V_{dc2}$) condition shown, it is clear that for power levels below 4 kW both the RMS and peak current values are substantially reduced. As the maximum power transfer point is reached with $\alpha=\alpha_{p,opt}$ (i.e., $|\phi_f|$ close to $\pi/2$), the RMS and peak currents keep increasing while the power transfer flattens out.

The PWM choice of $\alpha_{opt}$ given by Equation (4) also leads to reduction in transformer size as shown in Table II below. Both discrete and integrated realization of the inductor are considered. The required core area and area product are used as comparison metrics.

TABLE II

Comparison of Magnetics.

| | Discrete | | | | Integrated | |
|---|---|---|---|---|---|---|
| | $\dfrac{AP_T}{V_{dc1}k_T/f_{sw}}$ | $\dfrac{AP_L}{LK_L}$ | $\dfrac{A_{cp}(k_cN_p)}{V_{dc1}}$ | $\dfrac{A_{cs}(k_cN_p)}{V_{dc1}}$ | $\dfrac{A_{cL}}{1/(N_pB_{max})}$ | $\dfrac{AP}{1/(JB_{max}k_w)}$ |
| Regular | $\dfrac{1+m_{max}}{2}I_{rms}$ | $\hat{I}I_{rms}$ | $m_{max}{}^\dagger$ | $m_{max}$ | $L\hat{I}$ | $I_{rms}\left(m_{max}\dfrac{V_{dc1}}{2f_{sw}}+L\hat{I}\right)^\dagger$ |
| PWM control | $I_{rms}$ | $\hat{I}I_{rms}$ | 1 | 1 | $L\hat{I}$ | $I_{rms}\left(\dfrac{V_{dc1}}{2f_{sw}}+L\hat{I}\right)$ |
| Reduction | $<\dfrac{2}{1+m_{max}}$ | <1 | $1/m_{max}{}^\dagger$ | $1/m_{max}$ | <1 | — |

Notes:
Turns ratio $N_{ps} = V_{dc1}/V_{dc2nom}$, AP denotes area product, $A_c$ denotes core area;
subscripts '$T$' and '$L$' indicate transformer and inductor, respectively;
subscripts '$p$' and '$s$' indicate primary and secondary, respectively;
$k_T$ & $k_L$ are constants depending on allowable maximum flux density $B_{max}$, current density J, and winding factor $k_w$; $k_c = 4f_{sw}B_{max}$;
†assumes same core for primary and secondary.

With respect to discrete realization, in the conventional DAB converter 10 (FIGS. 1A and 1B), the maximum primary referred volt-second product applied to the transformer winding (assuming a T-model implementation with the leakage inductance split equally) is $V_{dc1}(1+m_{max})/(2f_{sw})$ occurring at $\phi=0$ and $m=m_{max}$, the maximum value of m. With PWM, since the H-bridge 24 is modulated with $\alpha_s=\pi(1-1/m)$, the maximum volt-second product is $V_{dc1}/(2f_{sw})$ obtained at $\phi=0$. Thus, the core area of the transformer 26 is reduced by a factor of $1/(1+m_{max})$ with respect to that of the transformer 16 of the conventional DAB converter 10. For 1:2 output voltage range, this implies a transformer size savings of 33%. It may seem that by choosing a higher value for the turns ratio $N_{ps}$ (such that $m_{max}$ is increased), the transformer size can be reduced further. However, increasing $N_{ps}$ also increases RMS currents affecting both the transformer size and device conduction losses. The inductor size reduces depending on the reduction in the peak and RMS currents. It should be noted that size reduction calculation based on the area product metric is a first order approximation. Actual magnetics size reduction will also depend on several other factors such as allowable core temperature, ambient temperature, and the cooling mechanism.

With respect to integrated realization, in a practical integrated implementation the primary and secondary core legs of the transformer 26 of the DAB converter 20 could be realized with one set of C-C cores and therefore will have identical cross section areas, while the third leg (for the leakage flux) would be an additional C-core with a different cross sectional area. This is especially true if custom built cores are not used. In such cases, the primary and secondary core areas reduce by $1/m_{max}$, or 50% for a 1:2 output voltage variation.

Now that single PWM control has been described along with its advantages, dual PWM control will be described along with its advantages. For dual PWM control, PWM is simultaneously applied to both of the H-bridges 22 and 24. Simultaneous PWM of both of the H-bridges 22 and 24 is more complex since different modes arise depending on the relative values of $\alpha_p$, $\alpha_s$, and $\phi_f$. Further, for dual PWM, $\phi_f$ is expressed as $\phi_f=(\alpha_p+\alpha_s)/2$. Operating waveforms for the different modes, which are referred to herein as Modes IA, IB, II, III, and IV, are shown in FIGS. 5A through 5E. As the power level is reduced, the operation will transition from Mode IA (or IB) to Mode II and then either to Mode III or IV, depending on the relative values of $\alpha_p$ and $\alpha_s$. In order to keep explanation and notation simple, the discussion for dual PWM assumes $\phi_f>0$ and m<1. However, similar expressions result for other conditions. Expressions describing the current waveforms for Mode IV, normalized to $V_{dc1}/X_L$, are given below. Expressions for other modes are included in Appendix A.

$$i_a=0.5[-2m\phi_f+(1-m)\pi-(1-m)\alpha_p]$$

$$i_b=0.5[-(1-m)\pi+\alpha_p-m\alpha_s]$$

$$i_c=i_b$$

$$i_d=0.5[2m\phi_f+(1-m)\pi-(1-m)\alpha_p] \quad \text{Eqn. (8)}$$

Exact expressions for the average power transfer $P_{on}/m$ obtained from the current waveforms in the different modes are:

Eqn. (9)

Mode IA $$\phi_f\left(1-\dfrac{\phi_f}{\pi}\right)-\dfrac{\alpha_p^2+\alpha_s^2}{4\pi}$$

Mode IB $$\dfrac{(\pi-\alpha_p)(\pi-\alpha_s)}{2\pi}$$

Mode II $$\phi_f\left(1-\dfrac{\phi_f}{2\pi}\right)-\phi_f\dfrac{\alpha_p+\alpha_s}{2\pi}-\dfrac{(\alpha_p-\alpha_s)^2}{8\pi}$$

Mode III & IV $$\phi_f\left(1-\dfrac{\max(\alpha_p,\alpha_s)}{\pi}\right)$$

Equation (9) transitions to Equation (2) and Equation (1) as $\alpha_p$ and/or $\alpha_s$ are reduced to zero. Using a fundamental component approximation yields $$\frac{P_1}{m} \cong \frac{8}{\pi^2} \cos\left(\frac{\alpha_p}{2}\right) \cos\left(\frac{\alpha_s}{2}\right) \sin\phi_f \qquad \text{Eqn. (10)}$$

Numerical comparison shows that the fundamental approximation is close to the exact value, especially for $\alpha_p + \alpha_s < \pi$.

ZVS possibilities with dual PWM for the four converter legs (i.e., the leading and lagging legs of the H-bridge 22 and the leading and lagging legs of the H-bridge 24) assuming m<1 are listed in Table III below. As seen, ZVS for all switches is possible in Modes IA, Mode III, and Mode IV. All of the operating modes are discussed here with regard to RMS currents and ZVS range.

TABLE III

ZVS possibilities with dual PWM.

| Switches/leg | Condition | Mode IA | Mode IB | Mode II | Mode III | Mode IV |
|---|---|---|---|---|---|---|
| (S1, S2) HB1 leading leg | $I_d > 0$ | Y Y Y Y | Y Y | Y Y Y | Y Y | Y Y Y |
| (S3, S4) HB1 lagging leg | $I_a > 0$ | Y Y Y N | N Y | Y N Y | Y Y | Y Y N |
| (S1s, S2s) HB2 lagging leg | $I_b > 0$ | Y N N Y | Y N | N Y N | N N | N Y Y |
| (S3s, S4s) HB2 leading leg | $I_c > 0$ | Y Y N Y | Y Y | Y Y N | N Y | N Y Y |

Note:
Y indicates ZVS,
N indicates hard switching.
Under each mode, different columns indicate sets of ZVS possibilities.

Operation in Mode IA (FIG. 5A) can provide ZVS for all switches if the freewheeling intervals and the phase shift satisfy the following relations:

$$(1-m)\pi - 2\phi < \alpha_p - m\alpha_s < (1-m)\pi + 2m\phi.$$

Evidently these inequalities can only be satisfied for $\phi > 0$, with a simple choice being $\alpha_p - m\alpha_s = (1-m)\pi$. This is similar to the $\phi > 0$ case with single PWM, and the choice equates average voltage applied to the two transformer windings. Note that there is still one more degree of freedom in the choice of $\alpha_p$ and $\alpha_s$. Numerical evaluation shows that, for the same power transfer, the RMS currents with operation in Mode IA with dual PWM are higher than RMS currents with single PWM. Thus, Mode IA operation is not preferable over single PWM.

In Mode IB (FIG. 5B), the power transfer is independent of $\phi_f$ since for ($\alpha_p$, $\alpha_s$) such that $\alpha_p + \alpha_s > \pi$ the maximum power transfer level is reached at $\phi_f = \pi - (\alpha_p + \alpha_s)/2$ (upper boundary of Mode II) and equals the value for Mode IB. This fact is also evident from the waveforms for Mode IB, where changing $\phi_f$ only varies that part of the freewheeling time when no energy is transferred between the input, output, and the leakage inductance (L). This mode of operation is not preferable since it results in increased RMS currents without any change in power output and does not have ZVS for all switches.

Figure 5A:
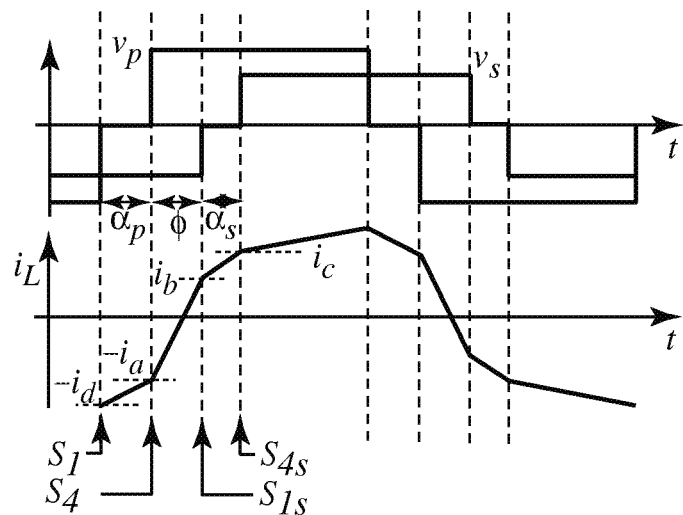
Figure 5B:
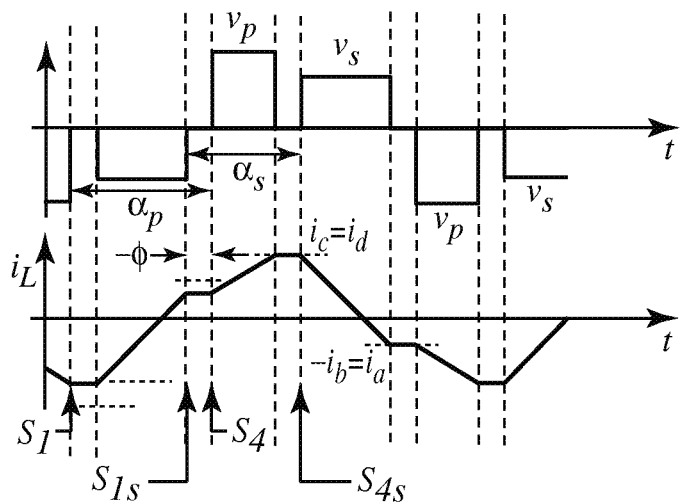
Figure 5C:
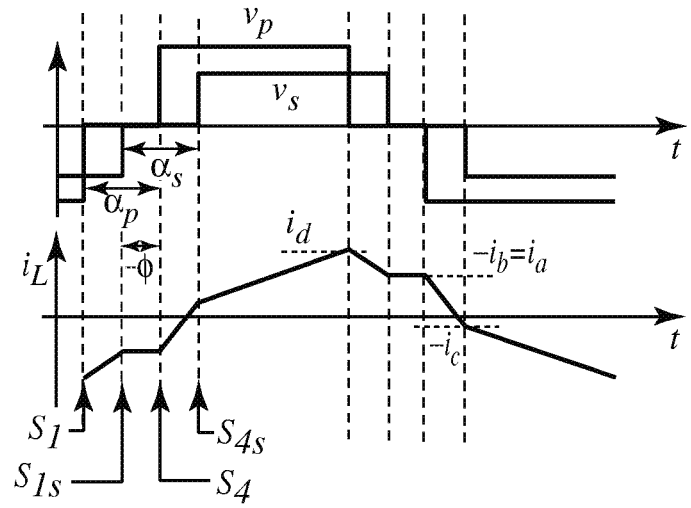
Figure 5D:
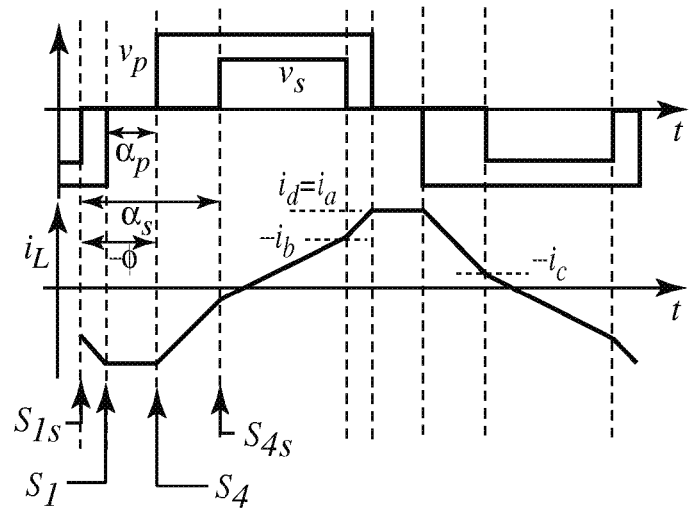
Figure 5E:
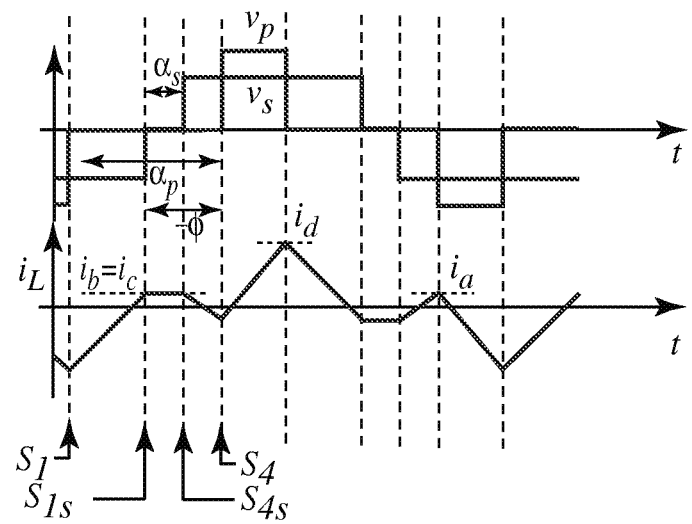

It is clear from the waveforms in FIG. 5C and Table III that Mode II does not provide ZVS for all switches and is therefore not preferable.

In Mode III (FIG. 5D), the H-bridge 22 always experiences ZVS, the lagging leg of the H-bridge 24 ($S_{1s}$, $S_{2s}$) always experiences hard switching, while the leading leg of the H-bridge 24 ($S_{3s}$, $S_{4s}$) has ZVS if $\alpha_s > \pi - 2\phi_f/(1-m)$. It is also clear from FIG. 5D that energy transferred to the output, during the time intervals when $V_s$ and $i_L$ have the same polarity, is very low compared to the energy circulated between the input and the leakage inductance (L) of the transformer 26. Thus, operation in Mode III results in high RMS currents.

In contrast to the operating modes mentioned above, Mode IV operation (FIG. 5E) does result in significant advantages and is therefore the preferred mode for dual PWM control. From Equations (8) and (9), it is evident that in Mode IV $i_a$, $i_d$, and $P_{on}$ are independent of $\alpha_s$ and $i_b$ is independent of $\phi_f$. FIG. 6 repeats the current and voltage waveforms for Mode IV to better illustrate circulating energy. In the middle plot in FIG. 6, the darker shaded area under the transformer current waveform indicates energy circulating between $V_{dc1}$ and the leakage inductance (L) while the lighter shaded area indicates the current freewheeling in the primary winding of the transformer 26. In the lowest plot in FIG. 6, the darker shaded area under the transformer current waveform indicates energy circulating between $V_{dc2}$ and the leakage inductance (L) while the lighter shaded area indicates the current freewheeling in the secondary winding of the transformer 26. In both plots, the unshaded area indicates energy transferred from $V_{dc1}$ to $V_{dc2}$. It is clear from these waveforms that circulating energy is minimized by $i_a = 0$ and $i_b = 0$. Combining these facts with the ZVS conditions of Table III and expressions for the current vertices from Equation (8), the following limiting conditions are obtained for the freewheeling intervals:

$$\alpha_p = \pi - \frac{2m}{1-m}\phi_f; \; \alpha_s = \pi - \frac{2}{1-m}\phi_f \qquad \text{Eqn. (11)}$$

These values for $\alpha_p$ and $\alpha_s$ theoretically ensure ZVS down to no load and simultaneously minimize RMS currents. In reality, a non-zero $i_a$ and $i_b$ are required to ensure there is sufficient inductive energy to discharge switch output capacitance and the transformer intra-winding capacitance. As such, the values of $\alpha_p$ and $\alpha_s$ may be slightly different than the exact values expressed in Equation (11) depending on the switch and winding capacitances. The switch capacitance is a non-linear function of the voltage across the switch. Thus, small correctional terms may be added to Equation (11) based on the specific hardware details of the DAB converter 20—values of the parasitic. Ideally, the correctional terms would be computed online and also take into account for variations with environmental conditions and aging. Thus, values for $\alpha_p$ and $\alpha_s$ may be chosen, based on the factors above, to approximately equal those in Equation (11) in order to maximize ZVS range (i.e., extend ZVS range to no load), minimize RMS currents, and to ensure that there is sufficient inductive energy to discharge switch output capacitance and the transformer intra-winding capacitance. Similar to single PWM, dual PWM for m<1 improves ZVS range for the switches in the H-bridge 24 while worsening the ZVS range for the lagging leg of the H-bridge 22.

Neglecting the magnetizing current, in Mode IV operation, the RMS current in the primary winding of the transformer 26 is given by $$\frac{I_{p,rms}}{V_{dc1}/X_L} = \left[\frac{\pi - \alpha_p}{3\pi}(i_d^2 + i_a^2 - i_d i_a) + \frac{\alpha_s}{3\pi}i_b^2 + \frac{\alpha_p + \phi}{3\pi}(i_a^2 + i_b^2 - i_a i_b) + \frac{-\alpha_s - \phi}{3\pi}(i_b^2 + i_d^2 - i_d i_b)\right]^{1/2} \qquad \text{Eqn. (12)}$$

where the current vertices $i_a$, $i_b$, and $i_d$ are as given in Equation (8). Notably, FIG. 9B compares RMS transformer current for the composite scheme (discussed later), which utilizes Mode IV operation for $\phi_f < \pi(1-m)/2$, with the other cases. As seen, RMS currents with Mode IV are lower and theoretically reduce to zero at zero power.

Note that for low power operation in Mode IV, the transformer windings see a significantly lower volt-secs. Flux linkage for the equivalent magnetizing inductance in the T-model referred to the primary, $\lambda_{pm}$ normalized to $V_{dc1}/(4\pi f_{sw})$, is given by:

$$\lambda_{pm} = \frac{1+m}{2}\pi - m\phi_f - \alpha_p - \frac{m}{2}\alpha_s \qquad \text{Eqn. (13)}$$

It is clear that primary referred flux linkage for the magnetizing inductance reduces with increasing $\alpha_p$ and $\alpha_s$. Specifically, using the freewheeling durations of Equation (11), we get $\lambda_{pm} = m^2/(1-m)\cdot\phi_f$. Theoretically, at zero load, $\phi_f = 0$ which gives zero flux in the transformer 26. Since the flux density in the transformer core is lower, core losses are reduced. The combination of lower peak and RMS currents, ZVS down to zero load, and reduced core losses in the transformer 26 all lead to a remarkable improvement in the low load converter efficiency. For instance, in one embodiment, efficiency at 3% load increased from 25% for the conventional DAB converter 10 to 77% with the DAB converter 20 using dual PWM control according to Equation (11).

FIG. 7 graphically illustrates a composite PWM control scheme utilized by the controller 30 (FIG. 2) to control the DAB converter 20 according to one embodiment of the present disclosure. In general, the controller 30 utilizes dual PWM control for low power conditions and transitions to single PWM control for higher power conditions. More specifically, with $\alpha_p$ and $\alpha_s$ as indicated in Equation (11), the controller 30 utilizes Mode IV dual PWM for $0<\phi_f<\pi(1-m)/2$ and transitions from Mode IV of dual PWM to single PWM with $\phi>0$ at $\phi_f=\pi(1-m)/2$. Alternatively, for $\phi_f>\pi(1-m)/2$, single PWM according to (4) or (6) could be used if lower maximum power transfer indicated in FIG. 9A is acceptable. To regain the full power capability of the DAB converter 20, $\alpha_p$ can be chosen such that $\alpha_p$ is equal to $\pi(1-m)$ at the boundary of single and dual PWM, i.e., $\phi_f=\pi(1-m)/2$, and $\alpha_p$ is reduced to zero at $\phi_f=\pi/2$. One exemplary scheme is a linear variation of $\alpha_p$ between these two points. The composite scheme is given by Equations (14) and (15).

$$\alpha_p = \begin{cases} \pi - \dfrac{2m}{1-m}\phi_f & 0 < \phi_f < \pi(1-m)/2 \\ (\pi - 2\phi_f)\dfrac{1-m}{m} & \pi(1-m)/2 < \phi_f < \pi/2 \end{cases} \qquad \text{Eqn. (14)}$$

$$\alpha_s = \begin{cases} \pi - \dfrac{2m}{1-m}\phi_f & 0 < \phi_f < \pi(1-m)/2 \\ 0 & \pi(1-m)/2 < \phi_f < \pi/2 \end{cases} \qquad \text{Eqn. (15)}$$

Notably, in Equations (14) and (15), both $\alpha_p$ and $\alpha_s$ are 0 at $\phi_f=\pi/2$. Thus, in the composite PWM control scheme of Equations (14) and (15), control transitions from dual PWM at low power to single PWM at intermediate power and then to no PWM (i.e., only phase shift control) at high power. An example of the composite scheme of Equations (14) and (15) for m=0.5 is illustrated in FIG. 8.

Although the composite PWM control scheme of Equations (14) and (15) restores full power capability of the converter for high $\phi_f$, it forgoes the reduction in transformer size. FIG. 9A compares the power transfer for three cases: the composite PWM control scheme of Equations (14) and (15), single PWM control as in Equation (4), and no PWM. As seen in FIG. 9B, the composite PWM control scheme also reduces RMS currents for higher loads (i.e., for $\phi_f>\pi(1-m)/2$). It should be noted that for a practical implementation in a region around $\phi_f=\pi(1-m)/2$, ZVS is lost for switches $S_3$ and $S_4$ as the order in which the turn-on transitions for $S_{1s}$, $S_{4s}$, and $S_4$ (and $S_{2s}$, $S_{3s}$, and $S_3$) occur is changed. In this region of $\phi_f$, $S_3$ and $S_4$ experience hard switching.

With dual PWM operation in Mode IV, the freewheeling intervals $\alpha_p$ and $\alpha_s$ depend on the input to output voltage ratio and the load of the DAB converter 20. The load dependence is implicit and represented by $\phi_f$ in the expressions of Equation (11). As in the single PWM case, $\phi_f$ is treated as the control variable while $\alpha_p$ and $\alpha_s$ are used to maximize operating efficiency of the DAB converter 20 for a given input voltage and output load condition.

FIG. 10 is a block diagram of the controller 30 of FIG. 2 that more specifically illustrates one exemplary implementation where the controller 30 controls the DAB converter 20 based on the input to output voltage ratio and the load of the DAB converter 20. In this exemplary embodiment, the controller 30 operates to regulate $\alpha_p$ and $\alpha_s$ to the desired values indicated in Equations (14) and (15). More specifically, in this embodiment, the controller 30 includes a subtractor 32 that outputs a difference between a reference voltage $V_{dc2,ref}$ and $V_{dc2}$ at the H-bridge 24. The reference voltage $V_{dc2,ref}$ may be a static value or may be varied to adjust the voltage or power of the DAB converter 20. For example, if the output is a battery, $V_{dc2,ref}$ may be provided by a battery management function. A voltage controller 34 then computes and outputs $\phi_f$ based on the difference between the reference voltage $V_{dc2,ref}$ and $V_{dc2}$ at the H-bridge 24 in such a manner as to reduce the difference value to zero. Note that the exact design of the voltage controller 34 (e.g., a Proportional-Integral (PI) controller) and its transfer function depend on a linearized model of the DAB converter 20, filter values, and maximum and minimum load current values. Also note that while in this embodiment $\phi_f$ is controlled based on a comparison of $V_{dc2,ref}$ and $V_{dc2}$, in another embodiment, $\phi_f$ is controlled based on a reference power value ($P_{ref}$) and an actual output power of the DAB converter 20.

A multiplier and divider 36 computes m based on the reference voltage $V_{dc2,ref}$ and the voltage $V_{dc1}$ at the H-bridge 22 according to the equation $m = N_{ps}V_{dc2,ref}/V_{dc1}$. Based on Equations (14) and (15), a calculation block 38 then calculates and outputs reference, or desired, values for $\alpha_p$ and $\alpha_s$, which are referred to herein as $\alpha_{p,ref}$ and $\alpha_{s,ref}$, based on $\phi_f$ from the voltage controller 34 and m from the multiplier and divider 36. A subtractor 40 then subtracts current values for $\alpha_p$ and $\alpha_s$ fed back from an output of a slow loops block 42 from the reference values $\alpha_{p,ref}$ and $\alpha_{s,ref}$ output by the calculation block 38 to provide corresponding difference values. The difference values are fed to the slow loops block 42, which in turn adjusts $\alpha_p$ and $\alpha_s$. In this manner, $\alpha_p$ and $\alpha_s$ are regulated to the desired values indicated in Equations (14) and (15). The slow loops block 42 operates as a rate limiter or filter that smoothes changes in $\alpha_p$ and $\alpha_s$. For example, if $\alpha_{p,ref}$ changes as a step with changing operating conditions, $\alpha_p$ will change not as a step but slower with a designed time constant so that it does not interfere with the main control mechanism and cause instability. The slow loops block 42 may be implemented as an exponential type convergence with a predefined time constant (e.g., on the order of 100 ms or higher), but is not limited thereto. The slow loops block 42 operates to decouple the main control loop (i.e., the loop based on $\phi_f$ as the control variable) from the efficiency optimization function implemented by following $\alpha_{p,ref}$ and $\alpha_{s,ref}$. Notably, the manner in which $\alpha_p$ and $\alpha_s$ are regulated may vary depending on the particular implementation. The embodiment of FIG. 10 is exemplary. For instance, an extremum seeking control scheme may alternatively be used. Lastly, a gate signal generation block 44 generates the control signals for the switches $S_1$-$S_4$ and $S_{1s}$-$S_{4s}$ in the H-bridges 22 and 24 of the DAB converter 20 based on $\phi_f$, $\alpha_p$, and $\alpha_s$ to thereby provide corresponding PWM control.

FIG. 11 illustrates a soft-start process that is performed by the controller 30 at start-up of the DAB converter 20 according to one embodiment of the present disclosure. First, the controller 30 sets the freewheeling intervals $\alpha_p$ and $\alpha_s$ to 180 degrees (step 100) and then operates to reduce the freewheeling intervals $\alpha_p$ and $\alpha_s$ to steady state values for single PWM control over a startup period (step 102). After the start-up period is over, the controller 30 controls $\phi_f$ to achieve a desired output power or voltage (step 104) and regulates the freewheeling intervals $\alpha_p$ and $\alpha_s$ according to the composite PWM control scheme described above (step 106).

An experimental prototype of the DAB converter 20 and the controller 30 has been constructed. However, the DAB converter 20 and the controller 30 are not limited to thereto. For the experimental prototype, the DAB converter 20 was designed for bidirectional power transfer up to 10 kW at $V_{dc1}=V_{dc2}=670$ V with a ±20% variation in $V_{dc2}$. Salient parameters of the power hardware are:

$$P_{on} = 10 \text{ kW} \quad f_{sw} = 40 \text{ kHz} \quad N_{ps} = 1$$
$$L = 100 \text{ }\mu\text{H} \quad L_m = 1 \text{ mH} \quad C_o = 13 \text{ }\mu\text{F}$$

where $L_m$ is the magnetizing inductance and $C_o$ is the output filter capacitance. The two H-bridges 22 and 24 are identical. Each switch $S_1$-$S_4$ and $S_{1s}$-$S_{4s}$ is realized by two parallel connected Insulated Gate Bipolar Transistors (IGBTs) (FGL40N120AND) giving an output switch capacitance of 660 pF. The transformer 26 has a structure similar to that shown in FIG. 1A. The primary and secondary legs of the transformer 26 are made with nano-crystalline C-cores (F3CC0063 made with FT-3M alloy from Hitachi) while the 'flux shunt' to incorporate the series inductance (L) is realized with custom ferrite blocks (Magnetics Inc. 'P'-type ferrite). The turns ratio is 1:1. Both the primary and secondary windings of the transformer 26 have 25 turns and are realized with copper foil. The transformer intra-winding capacitances are estimated to be 100 pF and 130 pF for the primary and secondary, respectively. The controller 30 was implemented using a TMS320F2808 DSP residing on an eZDSPF2808 evaluation board. Dead times were fixed to 0.55 μs. The input voltage ($V_{dc1}$) was maintained at 600 V while $V_{dc2}$ was regulated to a desired value by a PI controller implemented on the DSP. Using this experimental prototype, it was found that for $V_{dc2}=300$ V, the low load (140 W for a converter capacity of 4.5 kW, or 3% load) efficiency increases from 25% with no PWM, to 42% with single PWM, and to 77% with dual PWM, as shown in FIG. 12A. FIG. 12B illustrates the efficiency of the DAB converter 20 for low load conditions for $V_{dc1}=600$ V and $V_{dc2}=450$ V.

Those skilled in the art will recognize improvements and modifications to the preferred embodiments of the present disclosure. All such improvements and modifications are considered within the scope of the concepts disclosed herein and the claims that follow.

APPENDIX TO THE SPECIFICATION

Dual PWM Current Expressions

Expressions for current vertices for the different modes, normalized to $V_{dc1}/X_L$, are listed below.

Mode IA $$i_a = 0.5\lfloor 2m\phi_f - (1+m)\alpha_p + (1-m)\pi \rfloor$$
$$i_b = 0.5\lfloor 2\phi_f - (1+m)\alpha_s - (1-m)\pi \rfloor$$
$$i_c = 0.5\lfloor 2\phi_f + (1-m)\alpha_s - (1-m)\pi \rfloor$$
$$i_d = 0.5\lfloor 2m\phi_f - (1-m)\alpha_p + (1-m)\pi \rfloor$$

Mode IB $$i_a = 0.5\lfloor (1-m)\pi + m\alpha_s - \alpha_p \rfloor$$
$$i_b = -i_a$$
$$i_c = 0.5\lfloor (1+m)\pi - m\alpha_s - \alpha_p \rfloor$$
$$i_d = i_c$$

Mode II $$i_a = 0.5\lfloor m\alpha_s - \alpha_p + (1-m)\pi \rfloor$$
$$i_b = -i_a$$
$$i_c = 0.5\lfloor 2\phi_f + (1-m)\alpha_s + (1-m)\pi \rfloor$$
$$i_d = 0.5\lfloor 2m\phi_f - (1-m)\alpha_p + (1-m)\pi \rfloor$$

Mode III $$i_a = 0.5\lfloor m\alpha_s - \alpha_p + (1-m)\pi \rfloor$$
$$i_b = i_a$$
$$i_c = 0.5\lfloor -2\phi_f + (1-m)\alpha_s + (1-m)\pi \rfloor$$
$$i_d = 0.5\lfloor 2\phi_f + (1-m)\alpha_s - (1-m)\pi \rfloor$$

What is claimed is:

1. A system comprising:
a Dual Active Bridge (DAB) converter comprising a transformer, a first H-bridge that is connected to a primary winding of the transformer and controlled via first control signals, and a second H-bridge that is connected to a secondary winding of the transformer and controlled via second control signals; and
a controller adapted to provide the first and second control signals based on an input-to-output voltage ratio and load of the DAB converter such that, in addition to phase shift control:
Pulse Width Modulation (PWM) control is simultaneously applied to both the first H-bridge and the second H-bridge when the DAB converter operates at low power as determined based on the input-to-output voltage ratio and load of the DAB converter; and
PWM control is applied to only one of the first H-bridge or the second H-bridge when the DAB converter operates above low power as determined based on the input-to-output voltage ratio.

2. The system of claim 1 wherein the controller is further adapted to provide the first and second control signals in such a manner as to provide seamless transition between dual PWM control wherein PWM control is simultaneously applied to both the first H-bridge and the second H-bridge and single PWM control wherein PWM control is applied to only one of the first H-bridge or the second H-bridge.

3. The system of claim 1 wherein the controller is further adapted to apply PWM control simultaneously to both the first H-bridge and the second H-bridge when $\phi_f$ is in a range of 0 to $\pi(1-m)/2$, where $\phi_f$ is a phase shift between fundamental components of primary and secondary voltages of the transformer and is defined as $\phi_f = \phi + (\alpha_p + \alpha_s)/2$, $\phi$ is a phase shift control variable between the first H-bridge and the second H-bridge used for the phase shift control, $\alpha_p$ is a phase-shift applied between ones of the first control signals applied to leading and lagging legs of the first H-bridge to provide PWM of the first H-bridge, $\alpha_s$ is a phase-shift applied between ones of the second control signals applied to leading and lagging legs of the second H-bridge to provide PWM of the second H-bridge, $m=N_{ps}V_{dc2}/V_{dc1}$, $N_{ps}$ is a primary to secondary turns ratio of the transformer, $V_{dc1}$ is a voltage across the first H-bridge, and $V_{dc2}$ is a voltage across the second H-bridge.

4. The system of claim 3 wherein the controller is further adapted to apply the PWM control simultaneously to both the first H-bridge and the second H-bridge in a manner that maximizes a Zero Voltage Switching (ZVS) range of the DAB converter.

5. The system of claim 3 wherein the controller is further adapted to apply the PWM control simultaneously to both the first H-bridge or the second H-bridge according to the following equation:

$$\alpha_p = \pi - \frac{2m}{1-m}\phi_f;$$
$$\alpha_s = \pi - \frac{2}{1-m}\phi_f \text{ for } 0 < \phi_f < \pi(1-m)/2.$$

6. The system of claim 3 wherein the controller is further adapted to apply PWM control to only one of the first H-bridge or the second H-bridge when $\phi_f$ is in a range of $\pi(1-m)/2$ to $\pi/2$.

7. The system of claim 6 wherein the controller is further adapted to apply PWM to only one of the first H-bridge or the second H-bridge such that a phase-shift applied between leading and lagging legs of the one of the first and second H-bridges being pulse width modulated decreases from $\pi(1-m)$ at $\phi_f=\pi(1-m)/2$ to 0 at $\phi_f=\pi/2$.

8. The system of claim 6 wherein the controller is further adapted to apply PWM to only one of the first H-bridge or the second H-bridge such that a phase-shift applied between leading and lagging legs of the one of the first and second H-bridges being pulse width modulated linearly decreases from $\pi(1-m)$ at $\phi_f=\pi(1-m)/2$ to 0 at $\phi_f=\pi/2$.

9. The system of claim 6 wherein the controller is further adapted to apply PWM to only one of the first H-bridge or the second H-bridge according to the following equations:

$$\alpha_p = (\pi - 2\phi_f)\frac{1-m}{m} \text{ for } \pi(1-m)/2 < \phi_f < \pi/2, \text{ and}$$
$$\alpha_s = 0 \text{ for } \pi(1-m)/2 < \phi_f < \pi/2.$$

10. The system of claim 6 wherein the controller is further adapted to apply PWM to only one of the first H-bridge or the second H-bridge according to the following equations:

$$0.5 < m < 1 \Rightarrow \alpha_p = \pi(1-m), \alpha_s = 0$$

$$1 < m < 2 \Rightarrow \alpha_p = 0, \alpha_s = \pi(1-1/m) \text{ for } \pi(1-m)/2 < \phi_f < \pi/2.$$

11. The system of claim 6 wherein the controller is further adapted to apply PWM to only one of the first H-bridge or the second H-bridge such that a Root Mean Squared (RMS) current of the transformer is minimized.

12. The system of claim 6 wherein the controller is further adapted to apply PWM to only one of the first H-bridge or the second H-bridge to minimize a fundamental harmonic of a Root Mean Squared (RMS) current of the transformer according to the following equation:

$$\alpha_p = \alpha_{p,minI1} = 2\cos^{-1}(m/\cos\phi_f) \text{ for } \pi(1-m)/2 < \phi_f < \pi/2,$$

where $\alpha_{p,minI1}$ is a value of $\alpha_p$ that minimizes the fundamental harmonic of the RMS current of the transformer.

13. The system of claim 6 wherein the controller is further adapted to apply PWM to only one of the first H-bridge or the second H-bridge to minimize a fundamental harmonic and third harmonic of a Root Mean Squared (RMS) current of the transformer according to the following equation:

$$\alpha_p = \alpha_{p,minI13} = 2\cos^{-1}x \text{ for } \pi(1-m)/2 < \phi_f < \pi/2,$$

where $\alpha_{p,minI13}$ is a value of $\alpha_p$ that minimizes the fundamental and third harmonics of the RMS current of the transformer and x is the solution to $$16x^5 - 16x^3 - 4mx^2 + 30x - 26m = 0.$$

14. The system of claim 1 wherein the controller is further adapted to apply no PWM control to the first H-bridge and the second H-bridge for high power operation.

15. The system of claim 1 wherein the controller is further adapted to transition from PWM control of one of the first H-bridge and the second H-bridge to no PWM control at $\phi_f=\pi/2$, where $\phi_f$ is a phase shift between fundamental components of primary and secondary voltages of the transformer and is defined as $\phi_f=\phi+\alpha/2$, $\phi$ is a phase shift control variable and $\alpha$ is phase-shift applied between leading and lagging legs of one of the first H-bridge and second H-bridge to provide PWM of the one of the first H-bridge and the second H-bridge.

16. A method of controlling a Dual Active Bridge (DAB) converter comprising a transformer, a first H-bridge that is connected to a primary winding of the transformer and controlled via first control signals, and a second H-bridge that is connected to a secondary winding of the transformer and controlled via second control signals, comprising:
providing the first and second control signals based on an input-to-output voltage ratio and load of the DAB converter such that, in addition to phase shift control, Pulse Width Modulation (PWM) control is simultaneously applied to both the first H-bridge and the second H-bridge when the DAB converter operates at low power as determined based on the input-to-output voltage ratio and load of the DAB converter and PWM control is applied to only one of the first H-bridge and the second H-bridge when the DAB converter operates above low power as determined based on the input-to-output voltage ratio.

17. The method of claim 16 wherein providing the first and second control signals comprises:
determining the input-to-output voltage ratio and the load of the DAB converter; and
providing the first and second control signals based on the input-to-output voltage ratio and load of the DAB converter.

18. The method of claim 16 wherein providing the first and second control signals comprises providing the first and second control signals to apply PWM control simultaneously to both the first H-bridge and the second H-bridge when $\phi_f$ is in a range of 0 to $\pi(1-m)/2$, where $\phi_f$ is a phase shift between fundamental components of primary and secondary voltages of the transformer and is defined as $\phi_f=\phi+(\alpha_p+\alpha_s)/2$, $\phi$ is a phase shift control variable, $\alpha_p$ is a phase-shift applied between ones of the first control signals applied to leading and lagging legs of the first H-bridge to provide PWM of the first H-bridge, $\alpha_s$ is a phase-shift applied between ones of the second control signals applied to leading and lagging legs of the second H-bridge to provide PWM of the second H-bridge, $m=N_{ps}V_{dc2}/V_{dc1}$, $N_{ps}$ is a primary to secondary turns ratio of the transformer, $V_{dc1}$ is a voltage across the first H-bridge, and $V_{dc2}$ is a voltage across the second H-bridge.

19. The method of claim 18 wherein providing the first and second control signals comprises providing the first and second control signals to apply PWM control simultaneously to only one of the first H-bridge or the second H-bridge when $\phi_f$ is in a range of $\pi(1-m)/2$ to /2.

20. A method for soft-starting a Dual Active Bridge (DAB) converter comprising a transformer, a first H-bridge that is connected to a primary winding of the transformer and controlled via first control signals, and a second H-bridge that is connected to a secondary winding of the transformer and controlled via second control signals, comprising:
   setting a phase-shift between ones of the first control signals applied to a leading leg and a lagging leg of the first H-bridge to 180 degrees;
   setting a phase-shift between ones of the second control signals applied to a leading leg and a lagging leg of the second H-bridge to 180 degrees;
   reducing, over a start-up period, the phase-shift between the ones of the first control signals applied to the leading leg and the lagging leg of the first H-bridge and the phase-shift between the ones of the second control signals applied to the leading leg and the lagging leg of the second H-bridge to steady values for a single Pulse Width Modulation (PWM) control scheme in which PWM control is applied to only one of the first H-bridge or the second H-bridge; and
   after the start-up period has completed, providing the first and second control signals based on an input-to-output voltage ratio and load of the DAB converter such that, in addition to phase shift control, PWM control is simultaneously applied to both the first H-bridge and the second H-bridge when the DAB converter operates at low power as determined based on the input-to-output voltage ratio and load of the DAB converter and PWM control is applied to only one of the first H-bridge or the second H-bridge when the DAB converter operates above low power as determined based on the input-to-output voltage ratio.

* * * * *